(12) United States Patent
Asakura

(10) Patent No.: US 6,169,988 B1
(45) Date of Patent: Jan. 2, 2001

(54) DATA SHARING SYSTEM FOR EFFICIENTLY TRANSFERRING DATA ON NETWORK

(75) Inventor: Takayoshi Asakura, Tokyo (JP)

(73) Assignee: Nec Corporation, Tokyo (JP)

( * ) Notice: Under 35 U.S.C. 154(b), the term of this patent shall be extended for 0 days.

(21) Appl. No.: 09/100,752

(22) Filed: Jun. 22, 1998

(30) Foreign Application Priority Data

Jun. 20, 1997 (JP) .................................................... 9-163588

(51) Int. Cl.⁷ .................................................... G06F 17/30
(52) U.S. Cl. ............................ 707/10; 707/103; 709/200
(58) Field of Search ................................ 707/8, 10, 103, 707/3; 709/200

(56) References Cited

U.S. PATENT DOCUMENTS

| | | | |
|---|---|---|---|
| 5,327,556 | * | 7/1994 | Mohan et al. ............................ 707/8 |
| 5,493,728 | * | 2/1996 | Solton et al. ......................... 395/250 |
| 5,574,902 | * | 11/1996 | Josten et al. .............................. 707/1 |
| 5,737,536 | * | 4/1998 | Herrmann et al. .............. 395/200.59 |
| 5,765,036 | * | 6/1998 | Lim ...................................... 395/474 |
| 5,845,282 | * | 12/1998 | Alley et al. ............................. 707/10 |
| 5,864,679 | * | 1/1999 | Kanai et al. .................... 395/200.68 |
| 5,864,772 | * | 1/1999 | Alvarado et al. ......................... 702/9 |
| 5,940,827 | * | 8/1999 | Hapner et al. ............................ 707/8 |

FOREIGN PATENT DOCUMENTS

| | | |
|---|---|---|
| 2-234256 | 9/1990 | (JP) . |
| 6-131305 | 5/1994 | (JP) . |
| 9-153054 | 6/1997 | (JP) . |
| 9-185655 | 7/1997 | (JP) . |

\* cited by examiner

Primary Examiner—Thomas G. Black
Assistant Examiner—Frantz Coby
(74) Attorney, Agent, or Firm—Foley & Lardner

(57) ABSTRACT

A data sharing system in which a server comprises a connection party holding unit for holding access information, and a terminal equipment comprises a database for acquiring the corresponding data so to submit it to the application program when an application program issues a reference request of data and a connection party deciding unit for deciding a connection party calculating machine with reference to access information depending on the necessity, the database judging whether there exists a data name of the data specified by the reference request in the connection party holding unit when a reference request is issued, instructing the connection party deciding unit to decide a calculating machine of a connection party when there exits, and further issuing a data transfer request to the decided connection party, so to acquire the corresponding data.

17 Claims, 17 Drawing Sheets

FIG. 2

| DATE AND TIME | DATA NAME | TERMINAL EQUIPMENT NAME | PLACE | OPERATION |
|---|---|---|---|---|
| 201 ⌒ 1997.4.13 21:17 | KAN 1 | aaaa | AAA | UPDATE |
| 202 ⌒ 1997.4.13 19:33 | KAN 2 | bbbb | BBB | TRANSFER |

FIG. 5

| DATE | HOUR | CONTENT | PLACE |
|---|---|---|---|
| 1997.4.13 | 10:00 - 11:30 | DEVELOPMENT MEETING | BBB |
| 1997.4.13 | 13:00 - 14:00 | INVESTIGATION SESSION | AAA |
| 1997.4.13 | 15:00 - 17:00 | DEMONSTRATION | AAA |

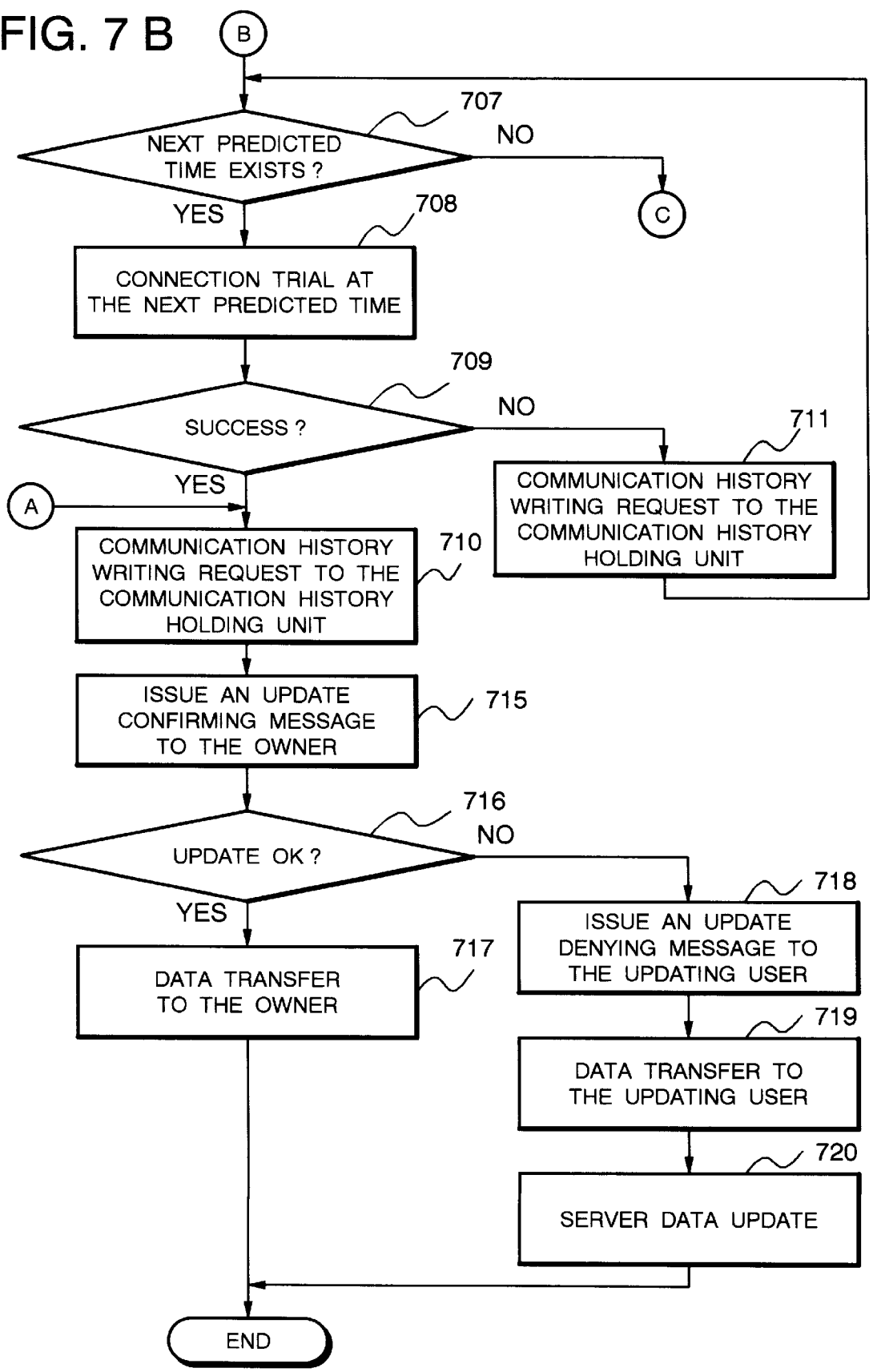

FIG. 8

| DATE | TIME | SUCCESS OR FAILURE IN CONNECTION | PLACE | |
|---|---|---|---|---|
| 1997.4.11 | 10:25 | SUCCESS | BBB | 801 |
| 1997.4.11 | 12:31 | FAILURE | BBB → AAA | 802 |
| 1997.4.11 | 15:29 | SUCCESS | AAA | 803 |
| 1997.4.11 | 21:46 | SUCCESS | AAA → ? | 804 |
| 1997.4.12 | 09:10 | FAILURE | BBB | 805 |

FIG. 11

| DATE AND TIME | DATA NAME | TERMINAL NAME | LOCATION | OPERATION | 1101 |
|---|---|---|---|---|---|
| 1997.5.22 14:21 | Freesoft.exe | TERMINAL B | 133.207.xxx.148 | TRANSFER | |
| 1997.5.22 14:20 | index.html | SERVER A | 133.207.xxx.6 | UPDATE | |
| . | . | . | . | . | |
| . | . | . | . | . | |
| . | . | . | . | . | |

FIG. 12

| DATE AND TIME | DATA NAME | TERMINAL NAME | LOCATION | OPERATION | 1201 |
|---|---|---|---|---|---|
| 1997.5.22 15:19 | Freesoft.exe | TERMINAL A | 133.207.xxx.147 | TRANSFER | |
| 1997.5.22 14:21 | Freesoft.exe | TERMINAL B | 133.207.xxx.148 | TRANSFER | |
| 1997.5.22 14:20 | index.html | SERVER A | 133.207.xxx.6 | UPDATE | |
| . | . | . | . | . | |
| . | . | . | . | . | |
| . | . | . | . | . | |

FIG. 14

| DATE | HOUR | CONTENT | PLACE |
|---|---|---|---|
| 1997.4.13 | 08:30 - 09:30 | DEPARTMENT MEETING | CCC |
| 1997.4.13 | 10:00 - 11:30 | DEVELOPMENT MEETING | BBB |
| 1997.4.13 | 13:00 - 14:00 | INVESTIGATION SESSION | AAA |
| 1997.4.15 | 15:00 - 17:00 | DEMONSTRATION | AAA ~1401 |

FIG. 15

| DATE | HOUR | CONTENT | PLACE | |
|---|---|---|---|---|
| 1997.4.13 | 08:30 - 09:30 | DEPARTMENT MEETING | CCC | ~1501 |
| 1997.4.13 | 10:00 - 11:30 | DEVELOPMENT MEETING | BBB | ~1502 |
| 1997.4.13 | 13:00 - 14:00 | INVESTIGATION SESSION | AAA | ~1503 |

FIG. 16

| DATE | HOUR | CONTENT | PLACE | PARTICIPANT |
|---|---|---|---|---|
| 1997.4.13 | 08:30 - 09:30 | REVIEW | AAA | USER C |

| DATE | HOUR | CONTENT | PLACE |
|---|---|---|---|
| 1997.4.13 | 10:00 - 11:30 | DEVELOPMENT MEETING | BBB |
| 1997.4.13 | 13:00 - 14:00 | INVESTIGATION SESSION | AAA |
| 1997.4.16 | 10:00 - 12:00 | REVIEW | AAA ~1701 |

FIG. 18

| DATE | TIME | SUCCESS OR FAILURE IN CONNECTION | PLACE | |
|---|---|---|---|---|
| 1997.4.11 | 10:25 | SUCCESS | BBB | ~1802 |
| 1997.4.11 | 12:31 | FAILURE | BBB → AAA | ~1803 |
| 1997.4.11 | 15:29 | SUCCESS | AAA | ~1804 |
| 1997.4.11 | 21:46 | SUCCESS | AAA → ? | ~1805 |
| 1997.4.12 | 09:10 | FAILURE | BBB → AAA | ~1806 |
| 1997.4.13 | 09:00 | FAILURE | CCC | ~1801 |

FIG. 19

| DATE | TIME | SUCCESS OR FAILURE IN CONNECTION | PLACE | |
|---|---|---|---|---|
| 1997 . 4 . 11 | 10 : 25 | SUCCESS | BBB | ∼1901 |
| 1997 . 4 . 11 | 15 : 29 | SUCCESS | AAA | ∼1902 |
| 1997 . 4 . 11 | 21 : 46 | SUCCESS | AAA → ? | ∼1903 |
| 1997 . 4 . 12 | 09 : 10 | FAILURE | BBB | ∼1904 |

FIG. 20

| HOUR | SIMPLE CONNECTION PROBABILITY | CONNECTION SUCCESS PROBABILITY | PLACE | |
|---|---|---|---|---|
| 10 : 00 - 11 : 30 | 50% | 35% | BBB | ∼2001 |
| 13 : 00 - 14 : 00 | 100% | 8% | AAA | ∼2002 |
| 14 : 00 - | 100% | 4.5% | AAA → ? | ∼2003 |

FIG. 21

| DATE | TIME | SUCCESS OR FAILURE IN CONNECTION | PLACE |
|---|---|---|---|
| 1997 . 4 . 13 | 09 : 00 | FAILURE | CCC |

FIG. 22

| DATE | TIME | SUCCESS OR FAILURE IN CONNECTION | PLACE |
|---|---|---|---|
| 1997 . 4 . 13 | 13 : 35 | SUCCESS | AAA |

FIG. 23

| DATE | HOUR | CONTENT | PLACE |
|---|---|---|---|
| 1997 . 4 . 13 | 08 : 30 - 09 : 30 | DEPARTMENT MEETING | CCC |
| 1997 . 4 . 13 | 10 : 00 - 11 : 30 | DEVELOPMENT MEETING | BBB |
| 1997 . 4 . 13 | 13 : 00 - 14 : 00 | INVESTIGATION SESSION | AAA |
| 1997 . 4 . 15 | 15 : 00 - 17 : 00 | DEMONSTRATION | AAA |
| 1997 . 4 . 16 | 10 : 00 - 12 : 00 | REVIEW | AAA |

2301

DATA SHARING SYSTEM FOR EFFICIENTLY TRANSFERRING DATA ON NETWORK

BACKGROUND OF THE INVENTION

1. Field of the Invention

The present invention relates to a data sharing system for sharing a database provided on a server among a plurality of terminal equipment connected to the server via a network, and more particularly, to a data sharing system for efficiently transferring data between the server and the terminal equipment.

2. Description of the Related Art

In this kind of data sharing system, necessary data may be downloaded from a server through a network line and stored into a database on a relevant terminal equipment, for the purpose of making use of the data stored in a database of a server. When only one terminal equipment is connected to a server, if reusing the data that has been once downloaded, the data stored in the database of the relevant terminal equipment can be available. However, in a data sharing system having a plurality of terminal equipment connected to a server, the data stored in the database of the server may have been updated by a different terminal equipment, and therefore, the latest data must be downloaded through access to the server every time a user makes use of the data.

This way of downloading the latest data from the database of the server every time data is required is very inefficient. Especially, it is a serious problem when the capacity of a network line is small.

A conventional technique to improve this defect is disclosed in, for example, Japanese Patent Publication Laid-Open (Kokai) No. Heisei 6-131305, "Radio Electronic Mail System". In the technique disclosed in the same publication, when the data stored in the database of a server is updated, the update history of the database is held. When a terminal equipment has access to the database, this update history is downloaded and the updating of the data is notified to the terminal equipment, and subsequently only the data that has been updated later than the last access is downloaded to be combined with the data stored in the database of the terminal equipment, thereby decreasing the communication amount.

The conventional system disclosed in the above publication, however, is on the assumption that a single user deals with a single database, and therefore, a user cannot necessarily refer to the latest data when a plurality of users share a plurality of databases. This is why, when a plurality of users share a plurality of databases, the data a given user wants to refer to has been already updated by another user, or the updated content by another user may not be reflected in the database of the server at the point when the given user gains access to the database of the server. In such a case, the given user cannot obtain the latest data that has been updated.

Further, when a terminal equipment is connected to a server via a network that may establish a connection at a necessary time, such as a dial-up connection by use of a telephone line, a connection between the both units must be established every time a user wants to gain the latest data from the server, which has been inefficient. Especially, when establishing a connection by use of an unstable line such as a public line by radio, there is a case in which a lot of connection trials, in spite of being in the impossible state of connection, would occupy the line, which has been very inefficient.

SUMMARY OF THE INVENTION

An object of the present invention is to provide a data sharing system capable of always referring to the latest data even in the case of sharing a plurality of databases among a plurality of users, for the purpose of efficient data transfer, by controlling the transfer destination of the data stored in a database of a server.

Another object of the present invention is to provide a data sharing system capable of decreasing useless connection trials, for the purpose of efficient data transfer, by controlling the communication history in each terminal equipment and the moving schedule of each terminal equipment in a server and predicting whether a connection to a given terminal equipment can be established.

According to one aspect of the invention, a data sharing system comprising a server, which is provided with a database with various data stored therein, capable of transferring the data between another calculating machine and itself and a terminal equipment having an application program capable of receiving the data held by the server through a network and at least referring to the data, for transferring the data between the server and the terminal equipment, wherein the server comprises a connection party holding means for holding access information indicating relationship between a data name of the transferred data and a calculating machine name of a transfer destination when transferring data, and the terminal equipment comprises a data acquiring means for supplying a deciding request of a connection party calculating machine for acquiring corresponding data, depending on the necessity, based on the reference request, when a data reference request has been issued from the application program and submitting the corresponding data obtained from the server or the given connection party calculating machine to the application program, and a connection party deciding means for deciding a connection party from calculating machines holding the data corresponding to the reference request, with reference to the access information held by the connection party holding means of the server, according to the connection party deciding request supplied from the data acquiring means, the data acquiring means, when the reference request is issued, judging whether the data name of the data specified by the reference request exists in the connection party holding means, with reference to the access information held by the connection party holding means of the server, acquiring the corresponding data by issuing the transfer request of the corresponding data to the database of the server when there is not the data name in the connection party holding means, and supplying a connection party deciding request for deciding a calculating machine of a connection party and further issuing a data transfer request to the connection party decided by the connection party deciding means so as to obtain the corresponding data when there is the data name.

In the preferred construction, when the reference request is issued, the data acquiring means of the terminal equipment checks whether the corresponding data is held in the own terminal equipment and when it is held, submits the corresponding data being held to the application program without accessing the server or the given connection party calculating machine.

In the preferred construction, in the terminal equipment, the application program includes a function of updating data in addition to data reference, and the data acquiring means supplies the update request to the database of the server when an update request of data is issued from the application program, while in the server, the database updates corresponding data in reply to the update request, and the connection party holding means records the relationship between a data name of updated data in the database and a calculating machine name of the terminal equipment having issued the above update request.

In the preferred construction, in the terminal equipment, the application program includes a function of updating data in addition to data reference, and the data acquiring means supplies the update request to the database of the server when an update request of data is issued from the application program, while in the server, the database updates corresponding data in reply to the update request, and the connection party holding means records the relationship between a data name of updated data in the database and a calculating machine name of the terminal equipment having issued the above update request, and when data of the database system is updated and a terminal equipment other than the terminal equipment having issued the update request refers to the updated data, the terminal equipment having issued the update request is also regarded as a candidate of a connection party.

In the preferred construction, the server further comprises a schedule holding means of holding schedule data of a user of the terminal equipment, a communication history holding means of holding connection history information including connection trial date and time and connection result as for the data transfer executed in the past, and a prediction means for predicting time of the highest possibility of connection to the terminal equipment it tries to connect to, with reference to the schedule data and the connection history, when transferring data from the server to the terminal equipment, thereby trying to connect to the terminal equipment that it wants to connect to, in a proper procedure, based on the prediction result of the prediction means.

In another preferred construction, in the terminal equipment, the application program includes a function of updating data in addition to data reference, and the data acquiring means supplies the update request to the database of the server when an update request of data is issued from the application program, while in the server, the database updates corresponding data in reply to the update request, and the connection party holding means records the relationship between a data name of updated data in the database and a calculating machine name of the terminal equipment having issued the above update request, and the server further comprises a schedule holding means for holding schedule data of a user of the terminal equipment, a communication history holding means for holding connection history information including connection trial date and time and connection result as for the data transfer executed in the past, and a prediction means for predicting time of the highest possibility of connection to the terminal equipment it tries to connect to, with reference to the schedule data and the connection history, when transferring data from the server to the terminal equipment, thereby trying to connect to the terminal equipment that it wants to connect to, in a proper procedure, based on the prediction result of the prediction means.

In another preferred construction, the access information held by the connection party holding means of the server includes information on a location of the calculating machine that is a data transfer destination, and the connection party deciding means of the terminal equipment decides a connection party with reference to the information on the location included in the access information.

In another preferred construction, in the terminal equipment, the application program includes a function of updating data in addition to data reference, and the data acquiring means supplies the update request to the database of the server when an update request of data is issued from the application program, while in the server, the database updates corresponding data in reply to the update request, and the connection party holding means records the relationship between a data name of updated data in the database and a calculating machine name of the terminal equipment having issued the above update request, the access information held by the connection party holding means of the server includes information on a location of the calculating machine that is a data transfer destination, and the connection party deciding means of the terminal equipment decides a connection party with reference to the information on the location included in the access information.

In another preferred construction, the access information held by the connection party holding means of the server includes information on size of the transferred data, and the connection party deciding means of the terminal equipment decides a connection party with reference to the information on the data size included in the access information.

In another preferred construction, in the terminal equipment, the application program includes a function of updating data in addition to data reference, and the data acquiring means supplies the update request to the database of the server when an update request of data is issued from the application program, while in the server, the database updates corresponding data in reply to the update request, and the connection party holding means records the relationship between a data name of updated data in the database and a calculating machine name of the terminal equipment having issued the above update request, the access information held by the connection party holding means of the server includes information on size of the transferred data, and the connection party deciding means of the terminal equipment decides a connection party with reference to the information on the data size included in the access information.

In another preferred construction, the access information held by the connection party holding means of the server includes information on location of the calculating machine that is a data transfer destination as well as information on size of the transferred data, and the connection party deciding means of the terminal equipment decides a connection party with reference to the information on the location as well as the information on the data size included in the access information.

Also, in the terminal equipment, the application program includes a function of updating data in addition to data reference, and the data acquiring means supplies the update request to the database of the server when an update request of data is issued from the application program, while in the server, the database updates corresponding data in reply to the update request, and the connection party holding means records the relationship between a data name of updated data in the database and a calculating machine name of the terminal equipment having issued the above update request, the access information held by the connection party holding means of the server includes information on location of the calculating machine that is a data transfer destination as well as information on size of the transferred data, and the connection party deciding means of the terminal equipment decides a connection party with reference to the information on the location as well as the information on the data size included in the access information.

Also, the server further comprises a schedule holding means of, with respect to a user of the terminal equipment, holding schedule data including information on a place where the user stands at a given time, a communication history holding means of holding connection history information including connection trial date and time, connection result, and a place where the terminal equipment of a connection party was standing at the connection time, as for the data transfer executed in the past, and a prediction means for predicting time of the highest possibility of connection to the terminal equipment it tries to connect to, with reference to the schedule data and the connection history, when transferring data from the server to the terminal equipment, thereby trying to connect to the terminal equipment that it wants to connect to, in a proper procedure, based on the prediction result of the prediction means.

Also, in the terminal equipment, the application program includes a function of updating data in addition to data reference, and the data acquiring means supplies the update request to the database of the server when an update request of data is issued from the application program, while in the server, the database updates corresponding data in reply to the update request, and the connection party holding means records the relationship between a data name of updated data in the database and a calculating machine name of the terminal equipment having issued the above update request, the server further comprises a schedule holding means of, with respect to a user of the terminal equipment, holding schedule data including information on a place where the user stands at a given time, a communication history holding means of holding connection history information including connection trial date and time, connection result, and a place where the terminal equipment of a connection party was standing at the connection time, in the data transfer executed in the past, and a prediction means for predicting time of the highest possibility of connection to the terminal equipment it tries to connect to, with reference to the schedule data and the connection history, when transferring data from the server to the terminal equipment, thereby trying to connect to the terminal equipment that it wants to connect to, in a proper procedure, based on the prediction result of the prediction means.

According to another aspect of the invention, a data sharing system comprising a server, which is provided with a database with various data to be shared in a group stored therein, capable of transferring the data to one or a plurality of terminal equipment used by the group via a network and a terminal equipment capable of at least referring to the data held by the server, for transferring the data between the server and the terminal equipment, wherein the server further comprises a schedule holding means of holding schedule data of a user of the terminal equipment;

a communication history holding means of holding connection history information including connection trial date and time and connection result as for the data transfer executed in the past; and a prediction means for predicting time of the highest possibility of connection to the terminal equipment it tries to connect to, with reference to the schedule data and the connection history, when transferring data from the server to the terminal equipment, thereby trying to connect to the terminal equipment that it wants to connect to, in a proper procedure, based on the prediction result of the prediction means.

In the preferred construction, in the server, the schedule data held by the schedule holding means includes information on a place where the user stands at a given time, and the connection history information held by the communication history holding means includes information on a place where the terminal equipment of a connection party was standing at the connection time.

In the preferred construction, the terminal equipment comprises an application program capable of receiving the data held by the server through a network and at least referring to the data, for transferring the data between the server and the terminal equipment, a data acquiring means for supplying a deciding request of a connection party calculating machine for acquiring corresponding data, depending on the necessity, based on the reference request, when a data reference request has been issued from the application program and submitting the corresponding data obtained from the server or the given connection party calculating machine to the application program, the data acquiring means when the reference request is issued, acquiring the corresponding data by issuing the transfer request of the corresponding data to the database of the server.

In the preferred construction, the terminal equipment comprises an application program capable of receiving the data held by the server through a network and at least referring to the data, for transferring the data between the server and the terminal equipment, a data acquiring means for supplying a deciding request of a connection party calculating machine for acquiring corresponding data, depending on the necessity, based on the reference request, when a data reference request has been issued from the application program and submitting the corresponding data obtained from the server or the given connection party calculating machine to the application program, the data acquiring means, when the reference request is issued, checks whether the corresponding data is held in the own terminal equipment, when the corresponding data is held, submits the corresponding data being held to the application program without accessing the server or the given connection party calculating machine, when the corresponding data is not held, acquiring the corresponding data by issuing the transfer request of the corresponding data to the database of the server, and submits the corresponding data being held to the application program.

In another preferred construction, the terminal equipment comprises an application program capable of receiving the data held by the server through a network and at least referring to the data, for transferring the data between the server and the terminal equipment, a data acquiring means for supplying a deciding request of a connection party calculating machine for acquiring corresponding data, depending on the necessity, based on the reference request, when a data reference request has been issued from the application program and submitting the corresponding data obtained from the server or the given connection party calculating machine to the application program, in the terminal equipment, the application program includes a function of updating data in addition to data reference, and the data acquiring means supplies the update request to the database of the server when an update request of data is issued from the application program, while in the server, the database updates corresponding data in reply to the update request, and the connection party holding means records the relationship between a data name of updated data in the database and a calculating machine name of the terminal equipment having issued the above update request.

In another preferred construction, the terminal equipment comprises an application program capable of receiving the data held by the server through a network and at least referring to the data, for transferring the data between the server and the terminal equipment, a data acquiring means for supplying a deciding request of a connection party calculating machine for acquiring corresponding data, depending on the necessity, based on the reference request, when a data reference request has been issued from the application program and submitting the corresponding data obtained from the server or the given connection party calculating machine to the application program, in the terminal equipment, the application program includes a function of updating data in addition to data reference, and the data acquiring means supplies the update request to the database of the server when an update request of data is issued from the application program, while in the server, the database updates corresponding data in reply to the update request, and the connection party holding means records the relationship between a data name of updated data in the database and a calculating machine name of the terminal equipment having issued the above update request, and when data of the database system is updated and a terminal equipment other than the terminal equipment having issued the update request refers to the updated data, the terminal equipment having issued the update request is also regarded as a candidate of a connection party.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 2 is a view showing the content of an access history stored in a connection party holding unit.

FIG. 5 is a view showing the content of schedule data stored in a schedule holding unit.

FIG. 8 is a view showing the content of a communication history stored in a communication history holding unit.

FIG. 11 is a view showing an example of the content of the data held by the connection party holding unit of FIG. 10.

FIG. 12 is a view showing another example of the content of the data held by the connection party holding unit of FIG. 10.

FIG. 14 is a view showing the content of the schedule data of the user C held by the terminal equipment C of FIG. 13.

FIG. 15 is a view showing the content of the schedule data of the user C held by the terminal equipment A of FIG. 13.

FIG. 16 is a view showing the content of a previous arrangement schedule input by the user A.

FIG. 17 is a view showing the content of the schedule data of the user C held by the terminal equipment A, after the user A inputs the previous arrangement schedule.

FIG. 18 is a view showing the content of a communication history stored in the communication history holding unit of FIG. 13.

FIG. 19 is a view showing the content of the schedule data held in a first candidate stack.

FIG. 20 is a view showing the content of a prediction list.

FIG. 21 is a view showing an example of the content of the history to be added to the communication history holding unit of FIG. 13.

FIG. 22 is a view showing another example of the content of the history to be added to the communication history holding unit of FIG. 13.

FIG. 23 is a view showing the content of the schedule data of the user C held by each database of the terminal equipment C, the terminal equipment A, and the schedule server of FIG. 13.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order not to unnecessarily obscure the present invention.

Figure 1:
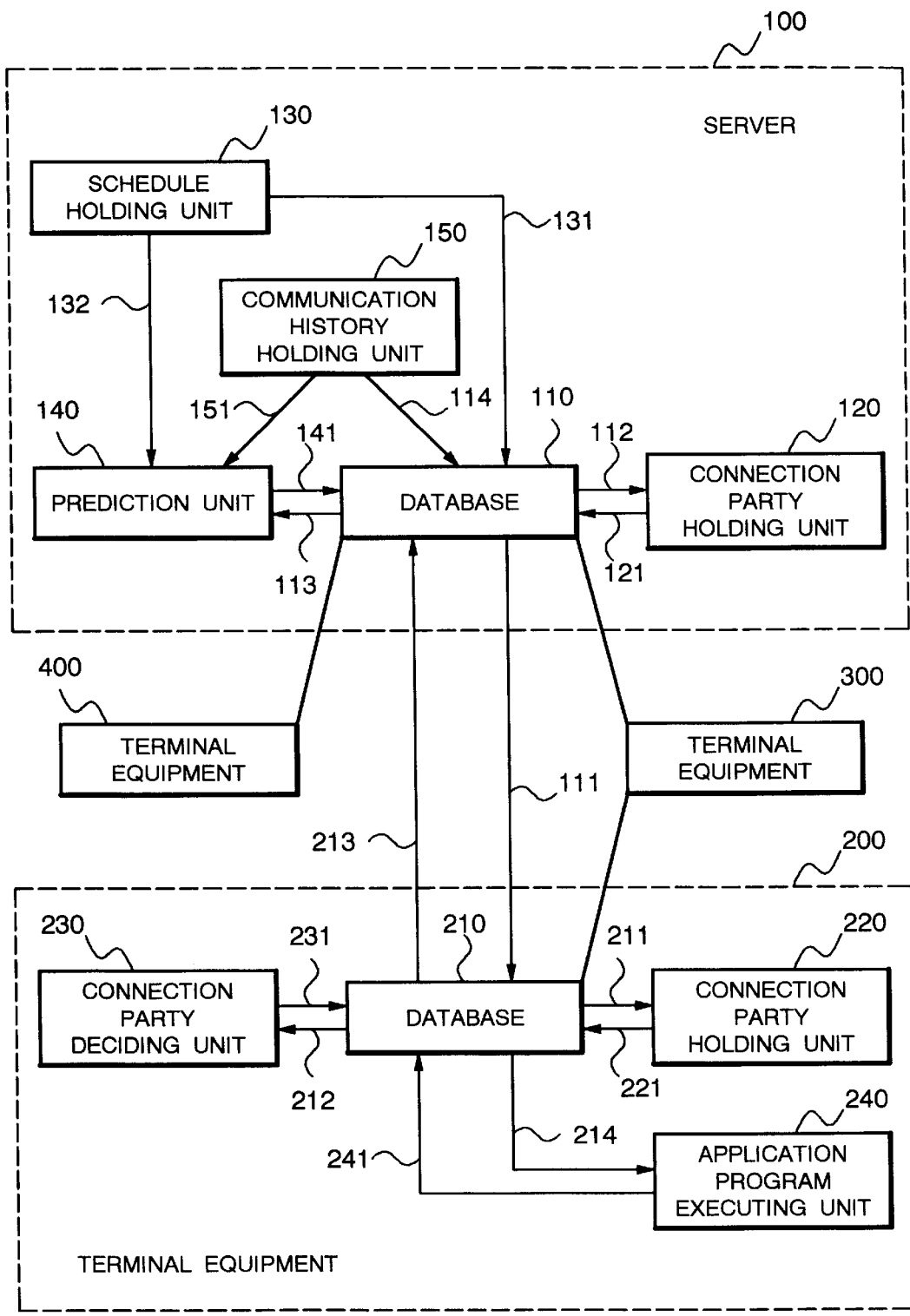
FIG. 1 is a block diagram showing a structure of a data sharing system according to one embodiment of the present invention.

FIG. 1 is a block diagram showing a structure of a data sharing system according to an embodiment of the present invention. Referring to FIG. 1, the data sharing system of the embodiment comprises a server 100 and a plurality of terminal equipment 200, 300, and 400 that are clients. FIG. 1 shows only the characteristic components in the embodiment, while the other general components are not described there.

The server 100 may be realized by a computer system such as a work station, a personal computer, or the like, and it can transfer data between itself and another server not illustrated, or a plurality of terminal equipment, through a network (regardless of cable or radio). Referring to FIG. 1, the server comprises a database 110 for storing given data, a connection party holding unit 120 for storing an access history concerned with the data held by the database 110, a schedule holding unit 130 for storing schedule data of a user, a prediction unit 140 for predicting the connection allowed time based on the schedule data held by the schedule holding unit 130, and a communication history holding unit 150 for storing a connection history concerned with various terminal equipment.

The terminal equipment 200 may be realized by a computer system such as a work station, a personal computer, or the like, and it can transfer data between the database 110 of the server 100 and itself via a network. Referring to FIG. 1, the terminal equipment 200 comprises a database 210 for storing the data obtained from the server 100, a connection party holding unit 220 for acquiring to store the access history stored in the connection party holding unit 120 of the server 100, a connection party deciding unit 230 for deciding a terminal equipment to be connected in order to obtain desired data, and an application program executing unit 240 for providing a given service to a user.

In the structure of the above-mentioned server 100 and the terminal equipment 200, every component is not always indispensable, but it is possible to form the present invention by the combination of proper components depending on a data sharing system to be built. For example, when the terminal equipment 200 is designed so as to obtain data from the database 110 of the server 100 inevitably, the connection party deciding unit 230 is not necessary. Each component may be realized by a program-controlled CPU and an internal memory such as a RAM or the like, or an external storage such as a magnetic disk or the like, in the above-mentioned computer system. The control program for controlling the CPU is provided, stored in a general storing medium such as a magnetic disk, an optical disk, a semiconductor memory, or the like, and it is loaded in the above-mentioned computer system so to execute each of the above functions.

In the data sharing system of thus constituted embodiment, each user using the terminal equipment 200, 300, and 400 stores the data shared among themselves into the database 110 of the sever 100. Depending on the necessity, he or she refers to the data within the database 110 (download) and updates the data (upload). In the embodiment, only one server 100 is provided there for the sake of the description. However, a plurality of servers may be provided there. Further, the number of terminal equipment is not restricted to three as illustrated, but any number of equipment may be provided there.

In the embodiment, assume that the terminal equipment 200 and 300 and the server 100 are connected via a network that may establish a connection at the necessary time, like a dial-up connection by use of a telephone line, for example, through a public line by cable or radio, and the terminal equipment 400 and the server 100 are connected via a network having a connection always established such as LAN or the like. Assume that the terminal equipment 200 and 300 can be connected by use of a public line by radio and that they are portable so as to be carried by users. As an example of a connecting through a public line by radio, a connection by use of a telephone line by radio such as a portable telephone may be considered. Though the terminal equipment 200, 300 and 400 have the identical structure, assume that the connection from the terminal equipment 400 to another terminal equipment can be made only through a network for use in a connection with a server.

In the server 100, the connection party holding unit 120 records an access history concerned with the data held in the database 110. The records include data name, name of a terminal equipment having transferred the data, place of the terminal equipment, transfer date and time, and correspondence relationship among operations about the data. The connection party holding unit 120 stores the access history including these records upon receipt of a data transfer recording request 112 from the database 110. Each history is recorded when the data is transferred from the server 100 to the terminal equipment 200 and when the data is returned to the server from the terminal equipment 200 (when the data is updated).

An example of the record content in the connection party holding unit 120 is shown in FIG. 2. The record space 201 indicates that the data "KAN1" was updated by the terminal equipment "aaaa" provided in the place "AAA" at 21:17 on Apr. 13, 1997. The record space 202 indicates that the data "KAN2" was transferred to the terminal equipment "bbbb" provided in the place "BBB" at 19:33 on Apr. 13, 1997. In the following description, the description "write the history of the operation [A]" means writing the history consisting of the operation [A] for data and the relative information (date and time, data name, terminal equipment name, place) concerned with the above operation [A].

When a connection request is issued from the terminal equipment 200 to the server 100, the content of the connection party holding unit 120 within the server 100 is transferred to the connection party holding unit 220 of the terminal equipment 200 having issued the request. The terminal equipment 200 judges whether the data intended to be acquired has been updated by another terminal equipment from the received content in the connection party holding unit 220.

In the terminal equipment 200, the connection party deciding unit 230 is referred to when there is a description of the data name of a data reference request 241 in the connection party holding unit 220. The connection party deciding unit 230 decides whether it should be connected to the server 100 or it should be connected to the other terminal equipment 300 or 400 having transferred the corresponding data from the server 100.

Methods of deciding a connection party by the connection party deciding unit 230 are as follows. Upon receipt of a connection party deciding request 212 from the database 210, the connection party deciding unit 230 obtains the current position of the terminal equipment 300 and 400 by use of a given device and calculates the distance between the position of the server 100 and the current position of the respective terminal equipment 300 and 400, for example, by use of geography database. This kind of technique is disclosed in the Japanese Patent Publication Laid-Open (Kokai) No. Heisei 9-153054 "Information Retrieval and Sending Terminal Equipment and Retrieval Server". The same publication discloses a technique for sending the information on each position where the server 100, the terminal equipment 300 or 400 stands, to the terminal equipment 200, as the geographical information including latitude and longitude, by use of GPS (Global Positioning System) and calculating each distance from the terminal equipment 200 to each of the other equipment. Then, it calculates each distance between the current position of the terminal equipment 200 and the respective received position of each terminal equipment 300 and 400, and a terminal equipment having the shortest distance, in the calculated distances, is decided as a connection party. As another method of deciding a connection party, a terminal equipment located at the nearest position to the terminal equipment 200 can be decided as a connection party, with reference to the information on the telephone number, IP address, and the place of the terminal equipment 300 and 400 to be connected. Or, a selection screen for presenting equipment of a selected party (the server 100 and the terminal equipment 300 and 400) is displayed, and a proper connection party may be decided and entered by a user. The connection party deciding unit 230 submits the decided connection party 231 to the database 210.

In the embodiment, when a user of the terminal equipment 200 updates the data stored in the database 110 of the server 100, either of the following two procedures will be performed. That is, the user of the terminal equipment 200 receives the data to be updated from the server 100, processes (changes) the data received by use of an application program executing unit 240, and delivers the processed portion to the server 100 as an update request 213a. Alternatively, new data is created by the application program executing unit 240 and the created data is delivered to the server 100 as an update request 213a. The server 100 updates the corresponding data stored in the database 110 upon receipt of the update request 213a.

When the data that the user of the terminal equipment 200 tries to update has been already updated by another user of another terminal equipment (for example, the terminal equipment 300), a transfer request of the updated data is made for the other terminal equipment (300) having updated the same data or the server 100 having the updated data so as to obtain the same data.

This time, operations of a server and a terminal equipment will be described in detail with reference to the drawings, on the assumption of various conditions. The operation of a terminal equipment will be represented as that of the terminal equipment 200. Since each terminal equipment 200, 300, and 400 has the identical structure as mentioned above, it is needless to say that any terminal equipment will do for describing the operation thereof.

Figure 3:
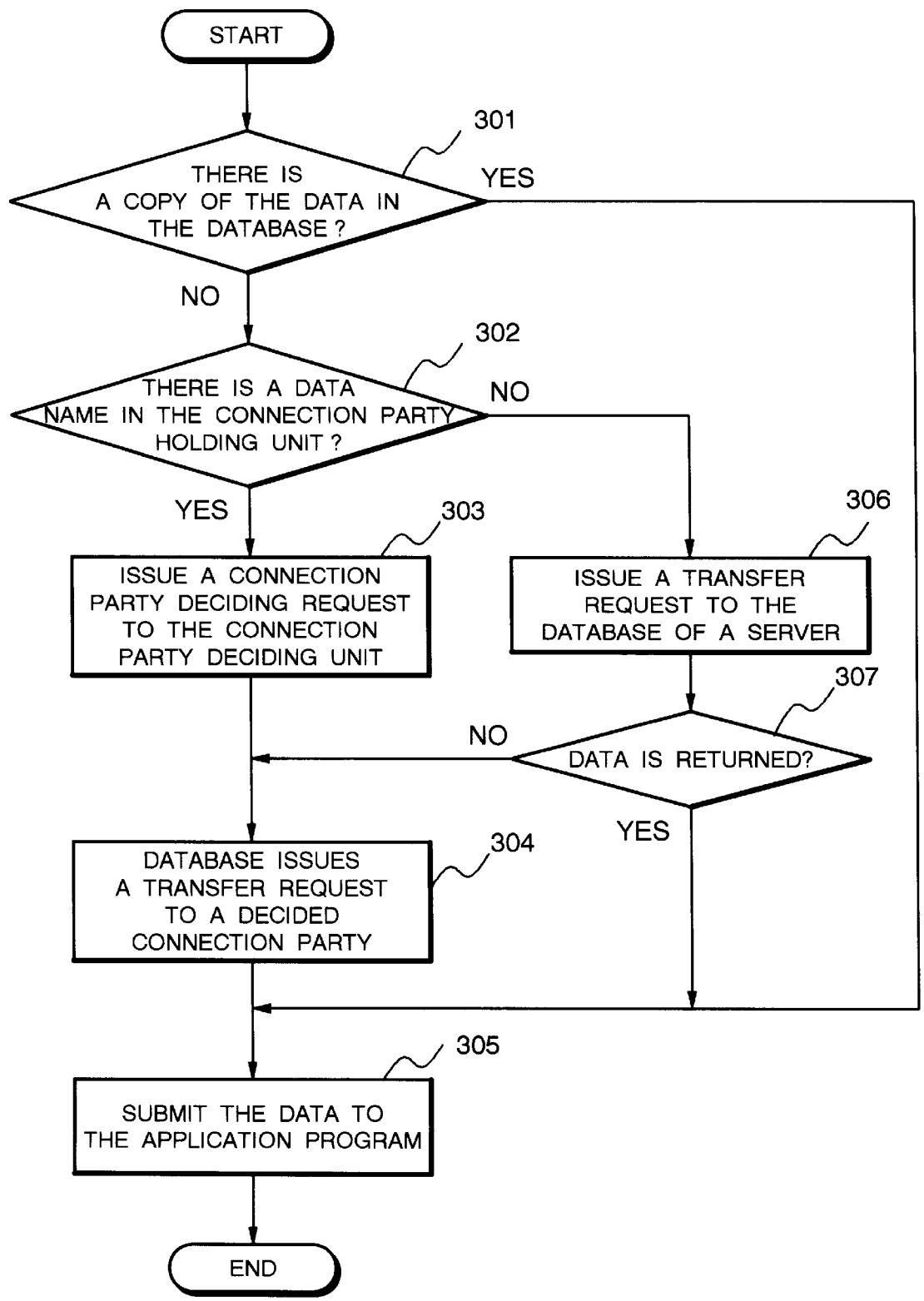
FIG. 3 is a flow chart showing an operation when the database of a terminal equipment receives a data reference request.

First, the description will be made in the case where the application program executing unit 240 of the terminal equipment 200 refers to the data within the database 110 of the server 100. In this case, the application program executing unit 240 issues the data reference request 241 to the database 210 of the terminal equipment 200. FIG. 3 shows the operation in the case where the database 210 receives the data reference request 241.

Referring to FIG. 3, the database 210 confirms the existence of a copy of the data desired by the data reference request 241 at first (Step 301). When there is the copy, the database 210 supplies the corresponding data to the application program executing unit 240 (Step 305) and finishes the operation without referring to the data within the database 110 of the server 100.

When there exists no copy of the desired data, the database 210 issues a data name confirmation request 211 to the connection party holding unit 220. The connection party holding unit 220 checks whether there exists the data name corresponding to the data name confirmation request 211 received from the database 210 and submits a confirmation result notice 221 to the database 210. With reference to the confirmation result notice 221 received from the connection party holding unit 220, the database 210 issues the connection party deciding request 212 to the connection party deciding unit 230 when there exists the corresponding data name in the connection party holding unit 220 (Steps 302 and 303). The connection party deciding unit 230 supplies the decided connection party 231 with the corresponding connection party described there to the database 210, upon receipt of the connection party deciding request 212. The detailed processing of the connection party deciding unit 230 will be described later. The database 210 sends a transfer request 213 of the corresponding data to the server 100, the terminal equipment 300, or the terminal equipment 400, that is the connection party described in the decided connection party 231 received from the connection party deciding unit 230 (Step 304).

The description will be continued, by way of example, on the assumption that the decided connection party 231 is the server 100. Upon receipt of the transfer request 213, the server 100 returns a copy 111 of the data corresponding to the transfer request 213. The database 210 of the terminal equipment 200 receives the copy of the desired data from the server 100 and submits it to the application program executing unit 240 (Step 305). The detailed processing when the server 100 receives the transfer request 213 from the terminal equipment 200 will be described later.

On the other hand, when there exists no data name of the desired data in the connection party holding unit 220 in Step 302, the database 210 directly delivers the transfer request 213 of the data to the database 110 of the server 100 without access to the connection party deciding unit 230 (Steps 302 and 306). Upon receipt of the copy 111 of the data corresponding to the transfer request 213 from the database 110 of the server 100, the database 210 submits the received data to the application program executing unit 240 (Steps 307 and 305).

When the data corresponding to the data transfer request 213 has been already transferred by a transfer request of another terminal equipment, the name of the terminal equipment of the transfer party, instead of the copy 111 of the corresponding data, will be returned from the server 100 to the terminal equipment 200. The terminal equipment 200 delivers the transfer request 213 of the corresponding data to the other terminal equipment of the transfer party. (Step 304). The database 210 receives the copy of the corresponding data from the other terminal equipment of the transfer party and supplies it to the application program executing unit 240 (Step 305).

As mentioned above, the application program executing unit 240 issues a data reference request 241 so as to receive corresponding data 214 and refer to the corresponding data. After the reference, it issues a reference finishing request 241a. Upon receipt of the reference finishing request 241a, the database 210 sends a reference finish message to the database 110 of the server 100. When a user of a terminal equipment wants to refer to the corresponding data promptly, acquisitive time priority specification may be attached there at the time of issuing the data reference request 241 from the application program executing unit 240. When the acquisitive time priority specification is attached to the data reference request 241, the data stored in the database 110 of the server 100 would be sent to the terminal equipment 200 first of all, regardless of whether the corresponding data has been transferred to another terminal equipment or not.

The application program executing unit 240 modifies the content of the data depending on the necessity, referring to the corresponding data, when there has been already the data corresponding to the data reference request 241 from the application program executing unit 240, in the database 210 of the terminal equipment 200, or after the corresponding data has been transferred from the equipment having had the corresponding data to the database 210. The database 210 returns the modified content to the server 100, and asks it to update the corresponding data stored in the database 110.

In this case, the application program executing unit 240 issues an update request 241b to the database 210 and upon receipt of the update request 241b, the database 210 issues the data update request 213a including a list of update data to the database 110 of the server 100. After completion of the update work, the database 110 submits the update result 111 to the database 210. When there exist some data which have not been updated, in the update requested data, the data which have not been updated will be returned to the database 210 and the database 210 will submit them to the application program executing unit 240.

Figure 4:
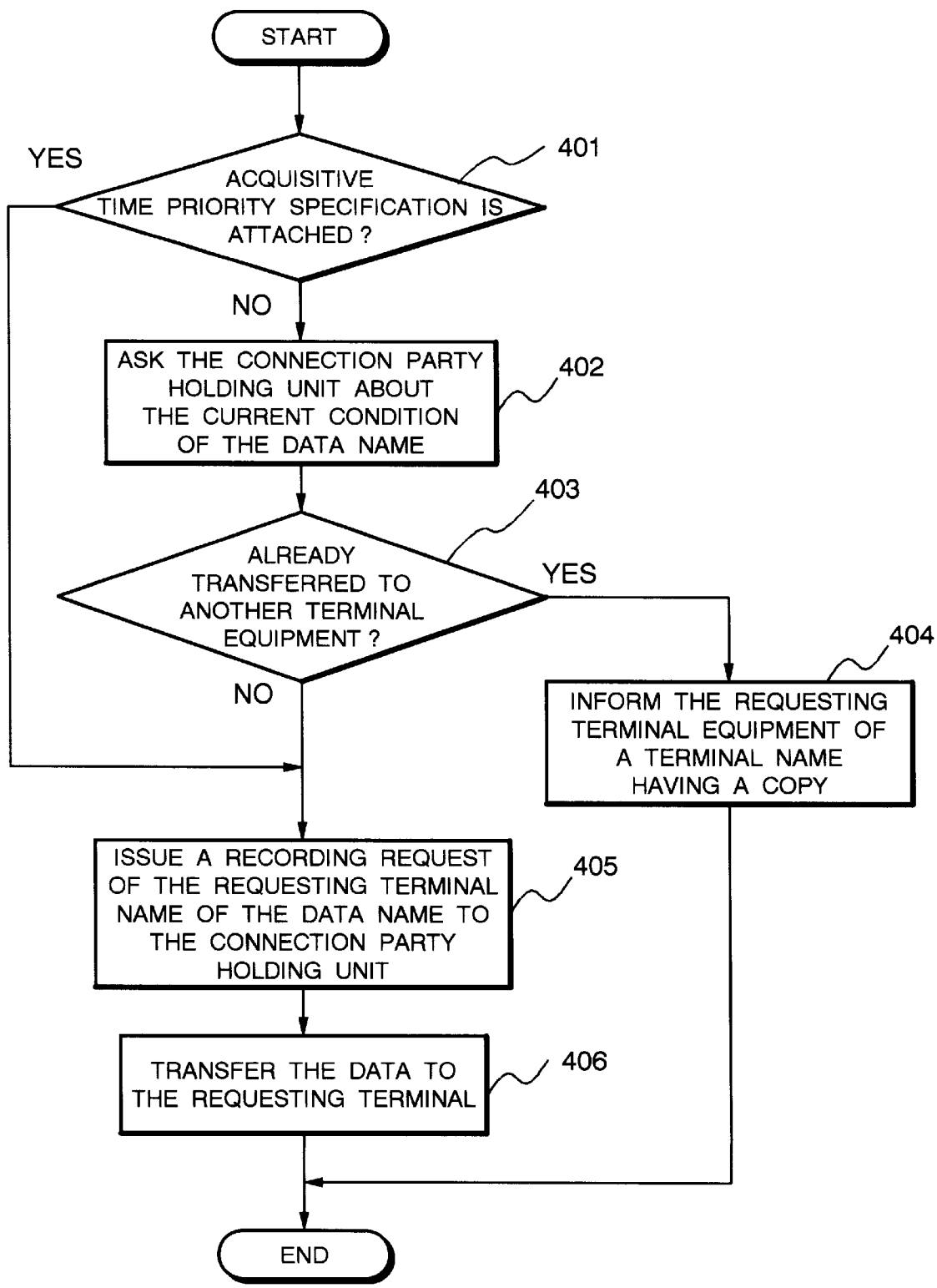
FIG. 4 is a flow chart showing an operation when the database of a server receives a data transfer request.

This time, the operation in the case where the database 110 of the server 100 receives the data transfer request 213 from the terminal equipment 200 will be described with reference to the flow chart of FIG. 4.

When the acquisitive time priority specification is attached to the received data transfer request 213, the database 110 issues a data transfer recording request 112 to the connection party holding unit 120 (Steps 401 and 405). Then, it submits the data corresponding to the data transfer request 213 to the database 210 of the requesting terminal equipment 200 (Step 406).

While, when the acquisitive time priority specification is not attached to the data transfer request 213, the database 110 issues a condition confirming request 112a of the data corresponding to the data transfer request 213 to the connection party holding unit 120 (Step 402). The connection party holding unit 120 checks the current condition of the corresponding data in reply to the condition confirming request 112a and returns the confirmation result 121 to the database 110. Referring to the confirmation result 121 returned from the connection party holding unit 120, the database 110 examines whether the corresponding data has been transferred to the other terminal equipment 300 or 400. If it has been transferred, the name of a terminal equipment of the transfer party is notified to the requesting terminal equipment 200 (Steps 403 and 404).

When the corresponding data has not been transferred to the other terminal equipment 300 nor 400, the database 110 issues the data transfer recording request 112 to the connection party holding unit 120 (Steps 403 and 405) and transfers the corresponding data to the requesting terminal equipment 200 (Step 406).

In the above processing, the data transfer request has been performed, from the terminal equipment 200 to the server 100, so to obtain the data in accordance with the transfer request. The database 110 of the server 100 writes the history of the reference finishing operation in the connection party holding unit 120 if receiving the reference finishing request from the terminal equipment 200.

When a transfer request for the data held by the database of a given terminal equipment (for example, the terminal equipment 300) is received from the other terminal equipment 200, the data corresponding to the transfer request is transferred from the database of the given terminal equipment to the terminal equipment 200, and a transfer substitute message to the effect that it substituted the transfer for the server 100 is sent to the server 100 holding the original data of the corresponding transferred data. The server 100 receiving the transfer substitute message writes the history of the transfer operation in the connection party holding unit 120.

Figure 6:
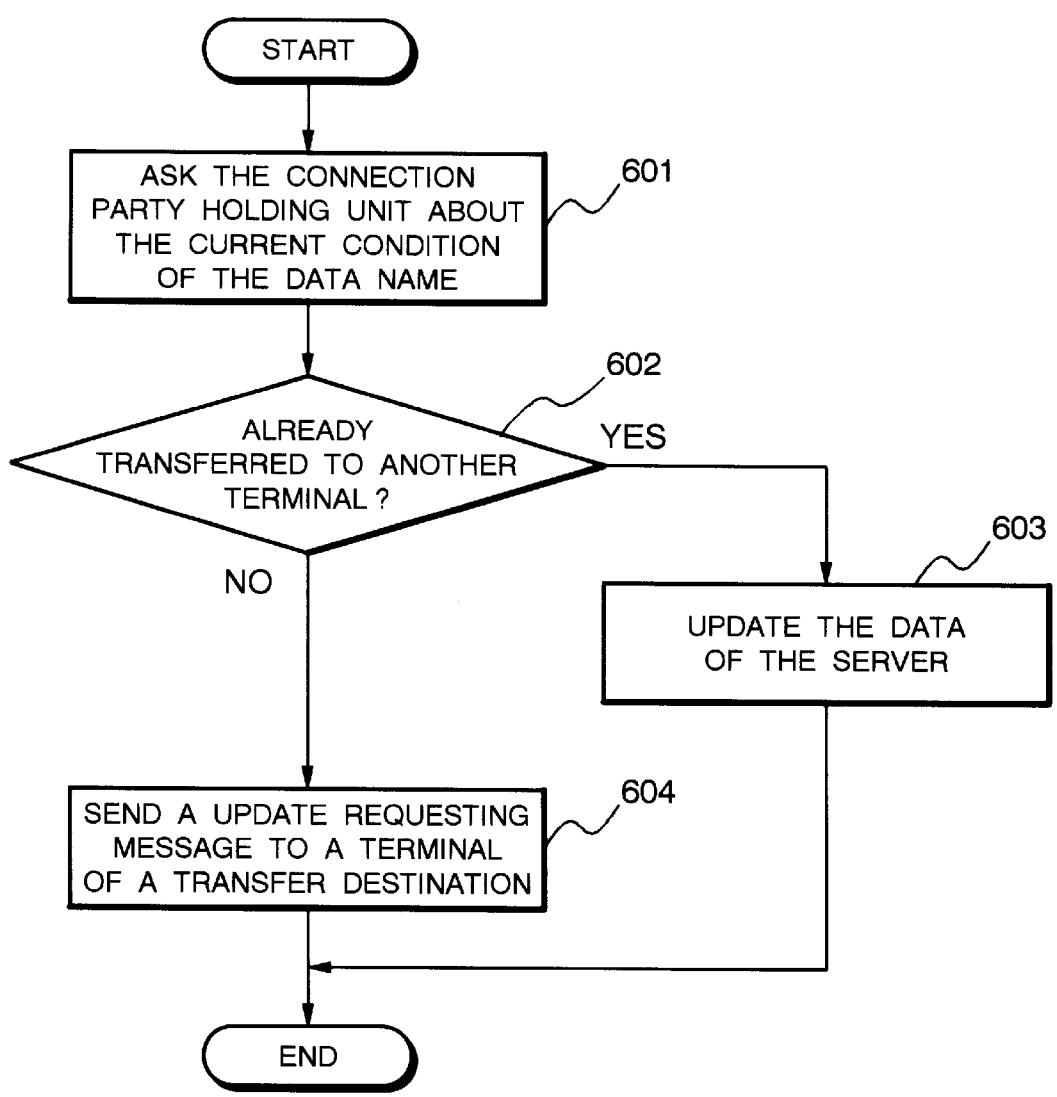
FIG. 6 is a flow chart showing an operation when the database of a server receives a data updating request.

Next, the operation in the case where the database 110 of the server 100 receives the data update request 213a together with the data and the data name from the terminal equipment 200 will be described with reference to the flow chart of FIG. 6.

Upon receipt of the data update request 213a, the database 110 supplies the condition confirming request 112a about the data to be updated to the connection party holding unit 120 (Step 601), and confirms the current condition of the corresponding data by obtaining the confirmation result 121 corresponding to the condition confirming request 112a. When the corresponding data has not been transferred to the other terminal equipment 300 nor 400, the content of the corresponding data stored in the database 110 is updated to the content of the data transferred from the update requesting terminal equipment 200 (Step 603). While, when the corresponding data has been transferred to the other terminal equipment 300 or 400, the update requesting message 111a is transferred to the terminal equipment of the corresponding data transfer destination recorded in the connection party holding unit 120 (Step 604).

In the terminal equipment 300 or 400 having received the update requesting message 111a, the database presents the content of the data to be updated and the content of the corresponding data existing within the database, and asks a user about the data which can be updated, of the data included in the update requesting message 111a. Only the data permitted to be changed by the user is updated and update request for the other data is cancelled. The content reflected by the above update and cancel will make the new content of the data. The user's reply result and the data will be returned to the database 110 of the server 100 as a reply to the update requesting message 111a.

The database 110 of the server 100 updates the content of the corresponding data to the content of the data attached to the reply upon receipt of the reply to the update requesting message 111a. When one of the update requesting message 111a or the whole of the message 111a is cancelled, the update and cancel results are presented to the update requesting terminal equipment 200.

Thanks to the above operations, the terminal equipment 200, 300, and 400 can refer to the data from a proper connection party when referring to the shared data. Further, when updating the data stored in the database 110 of the server 100 by the terminal equipment 200, 300, and 400, it is possible to reflect the update content not only in the database 110 of the server 100 but also in the databases of the other terminal equipment.

This time, the operations of the schedule holding unit 130, the prediction unit 140, and the communication history holding unit 150 will be described. When the data within the database 110 is updated by a user other than the user having the same data downloaded, according to the above operation having been described with reference to FIG. 6, the database 110, upon completion of the update work, notifies the users having the same data that the same data has been modified. The operation in this case will be described with reference to the flow charts of FIG. 7A and 7B.

At first, each schedule 31 of the users of the terminal equipment 200, 300, and 400 of a connection party is obtained from the schedule holding unit 130 (Step 701). Assume that the server 100 would try to connect to the terminal equipment 200 (Step 702), only to fail. As mentioned above, there is a possibility that the terminal equipment 200 cannot connect to the server, depending on a position where it stand, by a public line of radio. When the terminal equipment 200 cannot connect to the server 100, the database 110 fetches the item about the place of the schedule data 131 from the schedule holding unit 130, and sends to the communication history holding unit 150, a communication history writing request 114 together with the date, time, success or failure in connection, and connecting place (Steps 703 and 704).

The database 110 issues a time predicting request 113 to the prediction unit 140 (Step 705). When the prediction unit 140 can predict the connection possible time for the terminal equipment 200, a list 141 of the connection possible time is sent to the database 110 (Step 706). The database 110 selects the next connection possible time in the obtained time list 141, referring to the same list and tries to connect to the equipment again at the selected time (Steps 707 and 708).

When it cannot connect there in the trial of once more connection, the database 110 issues the communication history writing request 114 to the communication history holding unit 150 (Step 711) and returns to Step 707. Then, the next predicted time is selected to repeat the connection trial.

When there is no longer the predicted time next to the selected time in the time list 141 in Step 707, the database 110 will try a connection again after a given hour (Steps 707 and 712). If the connection fails, it issues the communication history writing request 114 to the communication history holding unit 150 (Step 714), and tries a connection again and again in every given hour until it can connect there (Step 712).

When the prediction unit 140 cannot predict the connection possible time of the terminal equipment 200 (the content of the time list 141 is "unclear"), a connection will be tried in every given hour (Steps 712 to 714).

In the trial of a connection in Step 702, or in the trial of one more connection in Step 708 or Step 712, if succeeding in the connection to the terminal equipment 200, the database 110 issues the communication history writing request 114 to the communication history holding unit 150 (Steps 703, 709, 713, and 710). Then, it issues an update confirming message to the connected terminal equipment 200 (Step 715). If receiving the command permitting the update from a user of the terminal equipment 200, the database 110 transfers the updated data to the terminal equipment 200 and substitutes it for the corresponding data within the database 210 of the terminal equipment 200 (Steps 716 and 717). If receiving the command denying the update from the user of the terminal equipment 200, the database 110 issues an update denial message to the terminal equipment having issued the update request of the corresponding data (Steps 716 and 718). Then, it transfers the corresponding data within the database 210 of the terminal equipment 200 to the terminal equipment having issued the update request (Step 719) and updates the data within the database 110 (Step 720).

When the database 110 issues the data transfer recording request 112 to the connection party holding unit 120, it obtains the previous (completed) schedule and the next schedule, and if there, the current schedule of a user of the terminal equipment of the data transfer destination, and confirms the place where the present terminal equipment is standing. When there is a current schedule, the place indicated in the current schedule is regarded as the place where the relevant terminal equipment is now standing. When there is no current schedule, in other words, when the terminal equipment is moving, where the terminal equipment is standing is represented by indicating both places of the previous schedule and the next schedule.

When the database of a terminal equipment receives an update denial message from the other terminal equipment, it instructs the application program executing unit 240 having updated the corresponding data to display the update denial message, and the application program executing unit 240 supplies the message indicating denial of updating to a user.

When the database of a terminal equipment receives an update confirming message from the other terminal equipment, it instructs the application program executing unit 240 to deal with the corresponding data to display the update confirming message, and the application program executing unit 240 supplies the message asking a user whether the updating should be performed or not, to the user. Input command from the user can be either update permission or update denial. Input result is delivered from the application program executing unit 240 to the database of the same terminal equipment, and further to the terminal equipment having issued the update request.

FIG. 5 shows the content of the schedule data held by the schedule holding unit 130. With reference to FIG. 5, the schedule data includes each item such as date, time, content, and place, which is to be input in advance by each user.

The communication history holding unit 150 holds the content upon receipt of a communication history writing request 114 from the database 110. The communication history writing request 114 includes each item of date, time, success or failure in connection, and connecting place. FIG. 8 shows one example of the content of the communication history held by the communication history holding unit 150. Referring to FIG. 8, the communication history contains the date and time when the database 110 tries to connect, success or failure in connection, and connecting place. The history data 801 in the item of place indicates that the present terminal equipment stands in the place "BBB", the history data 802 indicates that it is moving from the place "BBB" to the place "AAA", and the history data 804 indicates that it is moving from "AAA" to somewhere without clear destination. The history data 801 indicates that a connection was tried from the database 110 to a terminal equipment existing in "BBB" at 10:25 on Apr. 11, 1997, which was successful.

Figure 9A:
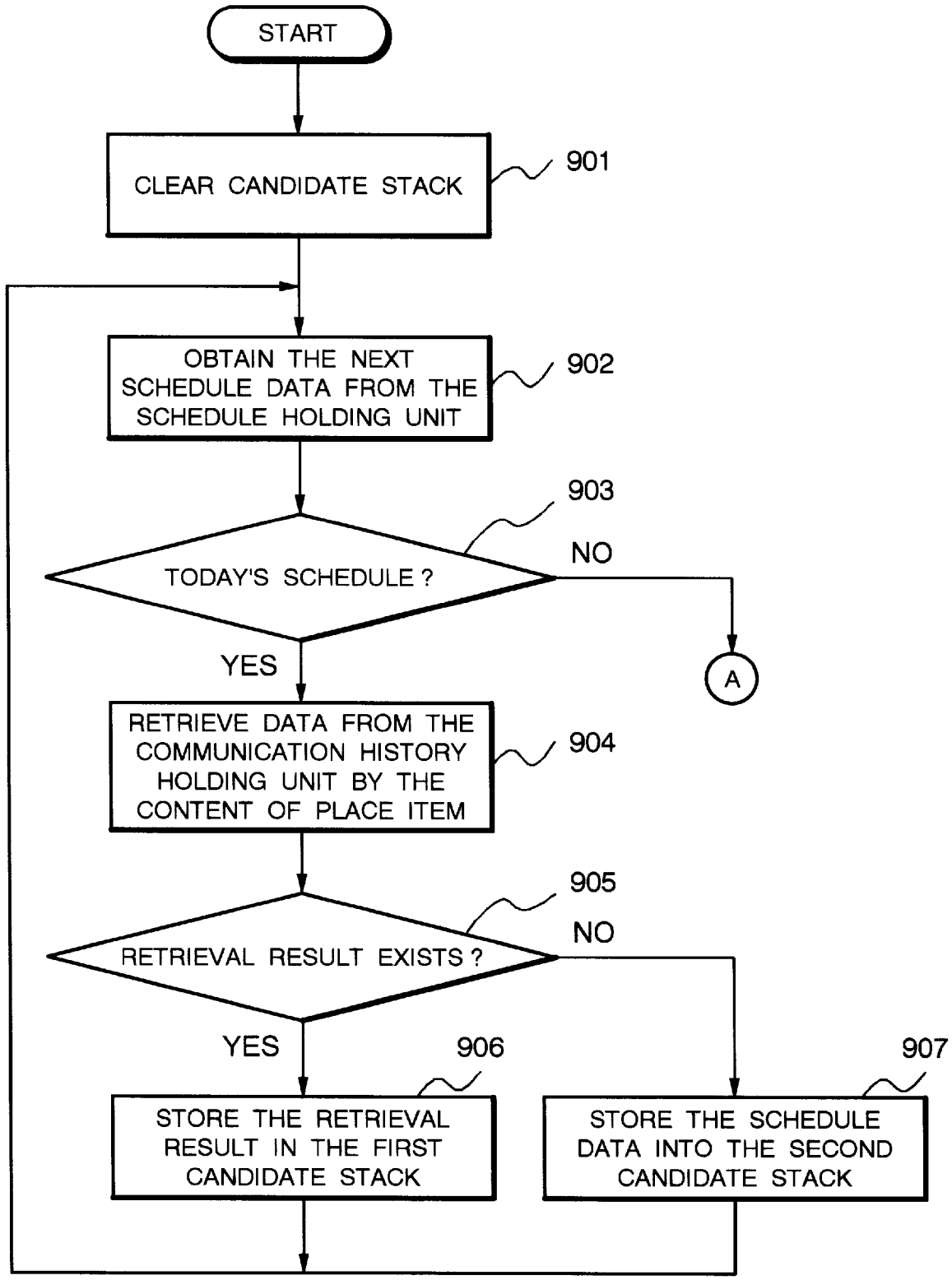
FIG. 9A is a flow chart showing an operation of a prediction unit.

The operation of the prediction unit 140 which creates the time list 141 upon receipt of the time predicting request 113 from the database 110, will be described with reference to the flow charts of FIG. 9A and 9B.

Assume that the prediction unit 140 has a first candidate stack and a second candidate stack, that are temporary storing areas, within itself. The prediction unit 140, upon receipt of the time predicting request 113, clears the first candidate stack and the second candidate stack (Step 901). Then, it obtains the next schedule data from the schedule holding unit 130 (Step 902). When the content of the place item of the obtained schedule data is different from the content of the place item of the schedule data previously obtained (when it moved or it is moving to another place), the content indicating that it is under moving is adopted as the next schedule. For example, when the previous schedule data indicates that it stands in the place "BA" and the present schedule data indicates that it stands in the place "BB", the place item for the next schedule should not be "BB", but be the content to indicate that it is moving from the place "BA" to the place "BB".

When the date item of the obtained schedule data is in coincidence with the date when the corresponding data was actually obtained, the prediction unit 140 searches the content of the communication history holding unit 150 by use of the content of the place item of the schedule data (Steps 903 and 904). If the content of a retrieval result 151 is not empty, the retrieval result is stored in the first candidate stack and step is returned to Step 902, where it obtains a schedule next to the present schedule data (Steps 905 and 906). While, when the content of the retrieval result 151 is empty in Step 905, the schedule data is stored in the second candidate stack and step is returned to Step 902, where it obtains a schedule next to the schedule data (Steps 905 and 907).

On the contrary, when the date item of the obtained schedule data is not in coincidence with the data when the corresponding data was actually obtained, the prediction unit 140 confirms the content of the first candidate stack (Steps 903 and 908), and if the previous retrieval result is being stored, it calculates the probability of succeeding in connection in every place indicated in the place item, in the schedule data held in the first candidate stack (Step 909). It obtains the time when the equipment stands in the corresponding place from the schedule holding unit 130 in the order from the highest connection success probability (Step 910). The connection success probability indicates not only the probability that a connection was successful in the same place (hereinafter, referred to as simple connection probability), but it is necessary to add the time element to the simple connection probability. More specifically, it is arranged so that the value of the probability may be smaller at a constant rate according as longer away from the time of confirming the content of the first candidate stack. After the above arrangement, the prediction unit 140 defines the time list or the time obtained from the schedule holding unit 130 as the predicted time and returns it to the database 110 (Step 914).

When there exists no retrieval result in the first candidate stack in Step 908, the prediction unit 140 confirms the content of the second candidate stack (Step 911). If the second candidate stack is not empty, the schedule data held in the second candidate stack is placed in the order from the data of the time item nearest to the time of confirming the content of the second candidate stack. The obtained time list is regarded as the predicted time (Step 912), and it is returned to the database 110 (Step 914). On the other hand, when the second candidate stack is empty, the predicted time as it is unclear is returned to the database 110 (Steps 911 and 913).

Thanks to the above operations, it can prevent from useless occupation of a line due to connection trials even in the state incapable of connecting to a given terminal equipment. Further, a terminal equipment holding the data transferred from the database 110 is capable of knowing that another terminal equipment makes an update request as for the corresponding data without access to the server 100 and refusing the update request depending on the necessity.

As set forth hereinabove, in the case of trying to get given data in a given terminal equipment, when the data has been already transferred to another terminal equipment from the server possessing the data, the data sharing system of the present invention makes a judgement whether the data should be obtained from the other terminal equipment, or from the server according to the relationship of the location between the terminal equipment and server, and the schedule of the owner of the terminal equipment, thereby acquiring the data efficiently.

When a server cannot be connected to a terminal equipment for the reason such as the restriction on a communication line, the data sharing system of the present invention can predict the possible time for acquiring the latest data by checking a time zone having the highest probability of connection, thereby transferring the data efficiently.

This time, the embodiment will be more specifically described, by way of example, in the case where it is adopted as a WWW (World Wide Web) system. Namely, the server 100 of FIG. 1 is adopted in the WWW server with various data stored in its database in order to provide with home pages or the other information. In the embodiment, when another server or terminal equipment gains access for the data stored by the WWW server, the information on the connection party is stored in the connection party holding unit. In the terminal equipment, desired data is obtained, by specifying the data storing place, for example, URL (Universal Resource Locator) in the WWW server having the desired data, by use of the application program executing unit 240 (for example, WWW browser). At this time, referring to the information of the connection party holding unit of the WWW server, it is judged which server or terminal equipment to be connected in order to efficiently obtain the desired data, by use of the connection party deciding unit, and the desired data is obtained by the connection to a proper connection party, based on the judgement result.

Figure 10:
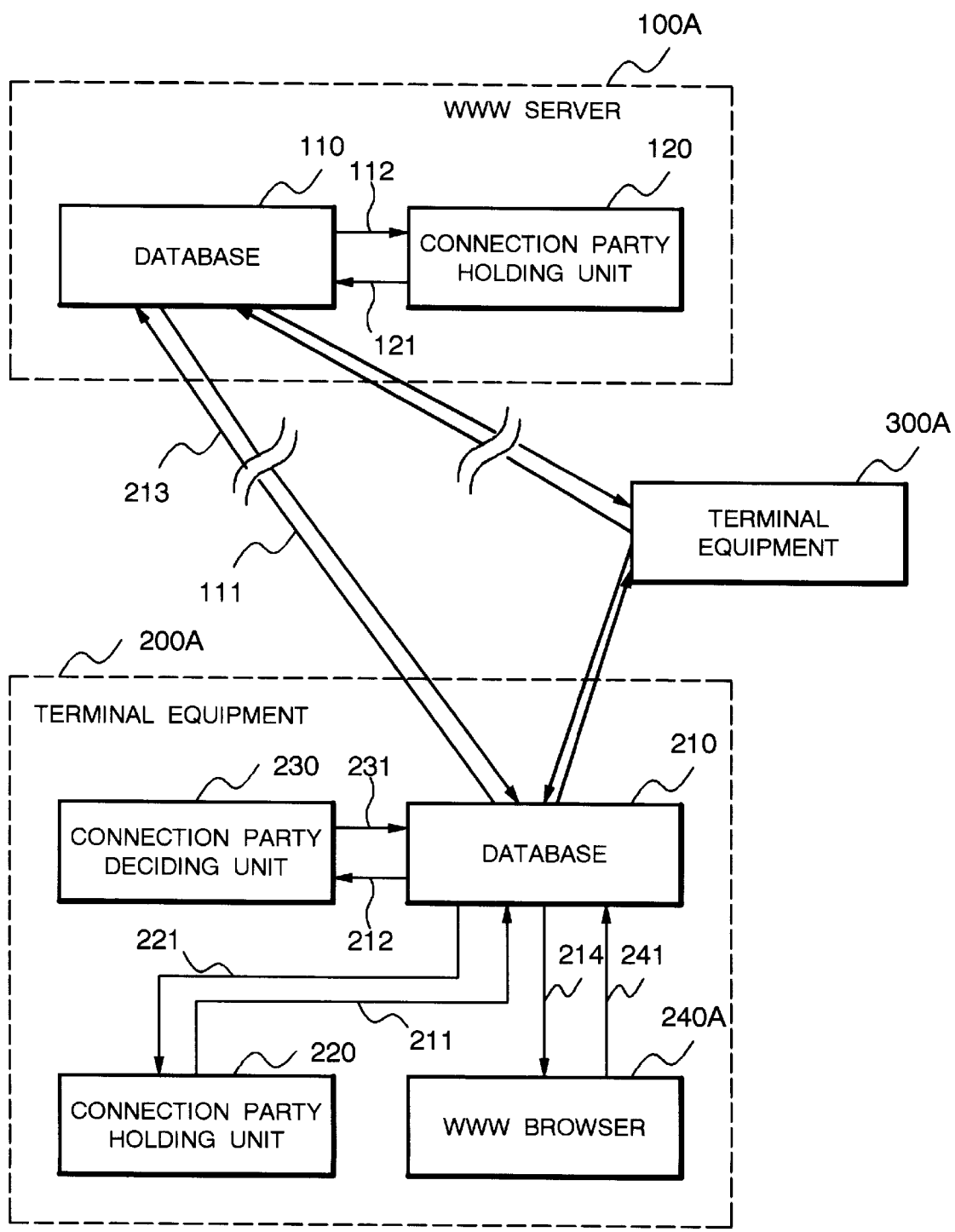
FIG. 10 is a block diagram showing an example with the data sharing system of the embodiment applied to the WWW system.

FIG. 10 is a block diagram showing a structure of the WWW system according to the embodiment. Referring to FIG. 10, though only one WWW server 100A is described as the WWW server for convenience of description, the number of the WWW server is not restricted to one, but assume that a lot of WWW servers providing various information prevail through a network. Further, it is needless to say that the number of terminal equipment is not restricted to two (the terminal equipment 200A and 300A).

Hereafter, the description will be made, by way of example, in the case where a user of the terminal equipment 200A obtains his or her desired data by specifying the location where the desired data is stored, by use of the WWW browser 240A that is an application program.

The user enters URL indicating the location of the WWW server having the user's desired data, by use of the WWW browser 240A (for example, Netscape Navigator (the trademark of Netscape Communications, Ltd. in the United States of America) and Internet Explorer (the trademark of Microsoft Corporation in the United States of America)). The information on the location of the WWW server corresponds to the data reference request 241 in the above-mentioned description of the embodiment, and the WWW browser 240A submits the location information supplied to the database 210. The user's desired data includes a download service of a home page and a file such as software and image provided in the home page.

The database 210, upon receipt of the location information from the WWW browser 240A, judges whether any copy of the data corresponding to the location information exists in the database 210 of the terminal equipment 200A. When there exists the copy, the corresponding data is returned to the WWW browser 240A. Even if there exists a copy of the data corresponding to the location information, when the copy is not that one recently copied, or when the user always desires the latest data, it may be set so that the corresponding data should not be returned to the WWW browser 240A.

Next, the database 210 is connected to the WWW server 100A corresponding to the location information and the information of the connection party holding unit 120 is copied into the connection party holding unit 220 of the present terminal equipment 200A. The database 210 judges whether there is the data name of the user's desired data in the connection party holding unit 220, by reference to the content of the connection party holding unit 220.

The content of the above processing will be described further in detail by an example. In the following example, the location of the WWW server 100A is to be expressed by URL represented as http://www.xxx.co.jp/ and the information on the corresponding home page can be seen on the WWW browser 240A by entry of the URL in the WWW browser 240A.

In this case, the database 210 copies the information held in the connection party holding unit 120 of the WWW server 100A, into the connection party holding unit 220 of the present terminal equipment 200A and judges whether there is the data name of the user's desired data in the connection party holding unit 220. Assuming that the content held in the connection party holding unit 120 is the content as shown in FIG. 11, when a user desires, for example, the data "Freesoft.exe", since it is coincidence with the content of the connection party holding unit 120 of FIG. 11, the database 210 supplies a connection party deciding request 212 to the connection party deciding unit 230. In this case, the connection party deciding request 212 includes the data on the connection party (corresponding to the space 1101 in the example of FIG. 11) held in the connection party holding unit 220 corresponding to the data and the user reference request 241 (location information). When there exists no data name desired by the user in the connection party holding unit 220, the database 210 obtains the user's desired data from the WWW server 100A represented as "http://www.xxx.co.jp/" and submits the same to the WWW server.

The processing content of the connection party deciding unit 230 will be described, this time. The connection party deciding unit 230, upon receipt of the connection party deciding request 212 from the database 210, makes a comparison between the location information of the WWW server 100A described in the user reference request 241 and the location information of the connection party data and returns the location (server or terminal equipment) where available data can be efficiently obtained, to the database 210 as the decided connection party 231. More specifically, each distance between the relevant terminal equipment and a server or a terminal equipment having the desired data is examined and the connection party nearest to the relevant terminal equipment is decided as a connection party. As a method of examining the distance between the equipment, it is possible to use a method of making a judgement based on IP address or domain name, or a method described in the above-mentioned Patent Publication Laid-Open No. Heisei 7-310858. Otherwise, the schedule holding unit 130, the prediction unit 140, and the communication history holding unit 150 described in the above embodiment may be provided in the relevant terminal equipment 200A, how the WWW server 100A is busy is predicted by the connection party deciding unit 230 using the prediction result of the prediction unit 140, and in a busy time zone, it may be connected to a terminal equipment or another server having once transferred the desired data, without connecting to the WWW server 100A. The information on the size of a file corresponding the data name is attached to the data held by the connection party holding unit 120, and it may be arranged that the connection party deciding unit 230 regards the WWW server 100A as the connection party with respect to the data under a given size and it regards a terminal equipment or a server nearer to the terminal equipment 200A as the connection party with respect to the data beyond the given size.

The database 210, upon receipt of the decided connection party 231 from the connection party deciding unit 230, makes a transfer request of the data desired by the user for a connection party corresponding to the decided connection party 231, so to obtain the corresponding data.

In the example as shown in FIG. 11, a transfer request of the data name "Freesoft.exe" is delivered to the terminal equipment B represented by IP address "133.207.xxx.148" as the connection party decided by the connection party deciding unit 230, so to obtain the data. When the decided connection party is the WWW server 100A, the transfer request 213 of the data name "Freesoft.exe" is delivered there, so to obtain the copy 111 of the corresponding data. In this case, the database 110 of the WWW server 100A issues the data transfer recording request 112 to the effect that the data name "Freesoft.exe" has been transferred to the terminal equipment 200A, to the connection party holding unit 120, and upon receipt of the transfer recording request 112, the connection party holding unit 120 records that the data name "Freesoft.exe" has been transferred to the terminal equipment 200A, into the connection party holding unit (refer to the space 1201 of FIG. 12).

As set forth hereinabove, the present invention is capable of building an efficient WWW system by adopting it in the WWW system, since a connection party capable of efficient data acquirement can be decided from a plurality of servers or terminal equipment having user's desired data.

This time, the description will be specifically made, by way of example, in the case where the embodiment is adopted in a schedule management system. Namely, the server 100 of FIG. 1 corresponds to a schedule server storing schedule data of all members of a group like an office group.

In this embodiment, each data stored by the schedule server necessarily belongs to each owner. When another server or terminal equipment accesses a relevant terminal equipment for the purpose of schedule operation for changing schedule data such as schedule reservation, input, cancellation, or the like, under the condition that an owner of given data has not transferred the schedule data to his or her own terminal equipment, updating of the corresponding data is notified to the terminal equipment of the data owner. If the data owner accepts the data updating notified from the server, the corresponding data of the terminal equipment of the data owner is updated, and if refusing the data updating, the corresponding data of the terminal equipment of the data owner is substituted for the data on the server and the data of updating user's terminal equipment (namely, return to the data before updating). At this time, when the terminal equipment of the data owner stands in the place where a connection is only successful by a public line outside office, the information about the place where the data owner stands is first obtained with reference to the schedule of the data owner before a lot of planless trials for connection. Then, assuming the probability of connection based on the past connection history in the same place, a list of the connection possible places is created. Further, a list of connection possible time is created based on the created list of the connection possible places and the schedule data of the data owner, and a connection will be tried based on this list.

Figure 13:
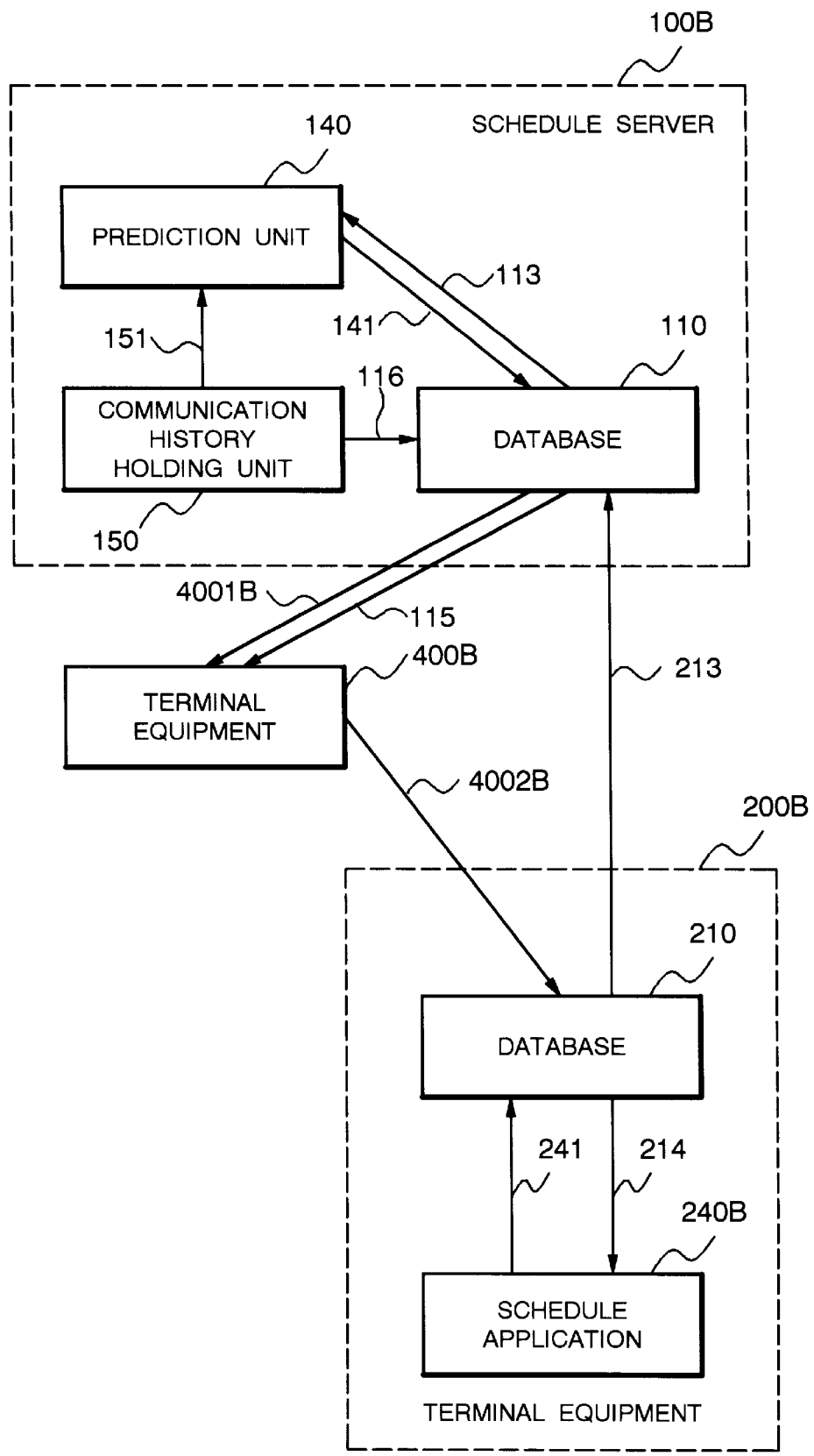
FIG. 13 is a block diagram showing an example with the data sharing system of the embodiment applied to a schedule shared system.

FIG. 13 is a block diagram showing a structure of the schedule management system according to the embodiment. Referring to FIG. 13, terminal equipment are mutually connected via a public line such as a portable telephone or the like, or a LAN, and each terminal equipment and a schedule server are connected similarly. For example, when a relevant terminal equipment stands in an office having the schedule server, they are connected via a LAN, while when it stands outside the office, they are connected via a public line. In the example shown in the drawing, the terminal equipment 400B connected to the schedule server 100B via a LAN and the terminal equipment 200B connected there via a public line are illustrated one by one, for the convenience of description. However, it is not restricted to this example, but, needless to say, a plurality of terminal equipment are connected to the schedule server 100B via a LAN and a public line.

The description will be made in the case where a user (referred to as the user A) of the terminal equipment 200B enters the arrangement schedule so as to make an arrangement with a user (referred to as the user B) of the terminal equipment 400B and the user B modifies the schedule data owned by his or her terminal equipment 400B. Assume that the user B holds his or her own schedule data in the terminal equipment 400B which is connected to the schedule server 100B via a public line outside the office, and that the user A is in the office, whose terminal equipment 200B is connected to the schedule server 100B via a LAN.

In the schedule management system in the embodiment, the database 110 of the schedule server 100B stores the schedule data of the user A and the user B. Initially, the schedule data of the user A and the user B respectively stored in the terminal equipment 400B, the terminal equipment 200B, and the schedule server 100B is the identical data.

Assuming that though the user B enters his or her new schedule in the terminal equipment 400B, the new schedule data is not delivered to the schedule server 100B to update the schedule data of the user B being stored in the database 110, the content of the schedule data of the user B held by the schedule server 100B is not in coincidence with the content of the schedule data of the terminal equipment 400B. Assume that the user A transferred the schedule data of the user B from the schedule server 100B to the terminal equipment 200B under this condition. An example of the schedule data of the user B held by the terminal equipment 400B in this case is shown in FIG. 14, and an example of the schedule data of the user B held by the terminal equipment 200B is shown in FIG. 15. FIG. 14 includes the schedule 1401 not included in FIG. 15, which is the new schedule entered by the user B.

The user A issues the schedule reference request 241c for the user B that is a participant of the arrangement from the application program executing unit 240B performing a schedule management. The schedule reference request 241c corresponds to the data reference request 241 in the embodiment described with reference to FIG. 1. Since there has been already the schedule data of the user B in the database 210 of the terminal equipment 200B, the database 210 returns the schedule data 214 to the application program executing unit 240B. When the user A enters the schedule (review) with the user B as shown in FIG. 16, the application program executing unit 240B adds the entered arrangement schedule 1601 to the existing schedule data 214. If the entered schedule 1601 conflicts with the existing schedule (double contact), it is also possible to supply an alarm informing the user of double contact, so to require an amendment of the schedule 1601. The application program executing unit 240 submits the schedule data 241 with the entered schedule 1601 added thereto to the database 210. FIG. 17 shows the content of the schedule data 241. In FIG. 17, the schedule 1701 is a newly entered schedule.

The database 210 supplies the update request 213a together with the schedule data of the user B held by the terminal equipment 200B, in order to reflect the amendment of the schedule data of the user B in the database 110 of the schedule server 100B. The database 110, upon receipt of the update request 213a, informs the terminal equipment 400B of the user B who is the owner of the corresponding data, of the data updating, in the procedure shown in the flow chart of FIG. 7.

The procedure of the database 110 informing the user B of the amendment of the schedule data will be described with reference to the flow charts of FIGS. 7A and 7B. Assume that this processing was performed at 9:00 on Apr. 13, 1997. The content of the schedule data of the user B held in the database 110 is as shown in FIG. 15, and the content of the connection history held in the communication history holding unit 150 of the schedule server 100B is as shown in FIG. 8. In this embodiment, since the schedule data is held in the database 110, the database 110 also has the function of the schedule holding unit 130 shown in FIG. 1.

Figure 7:
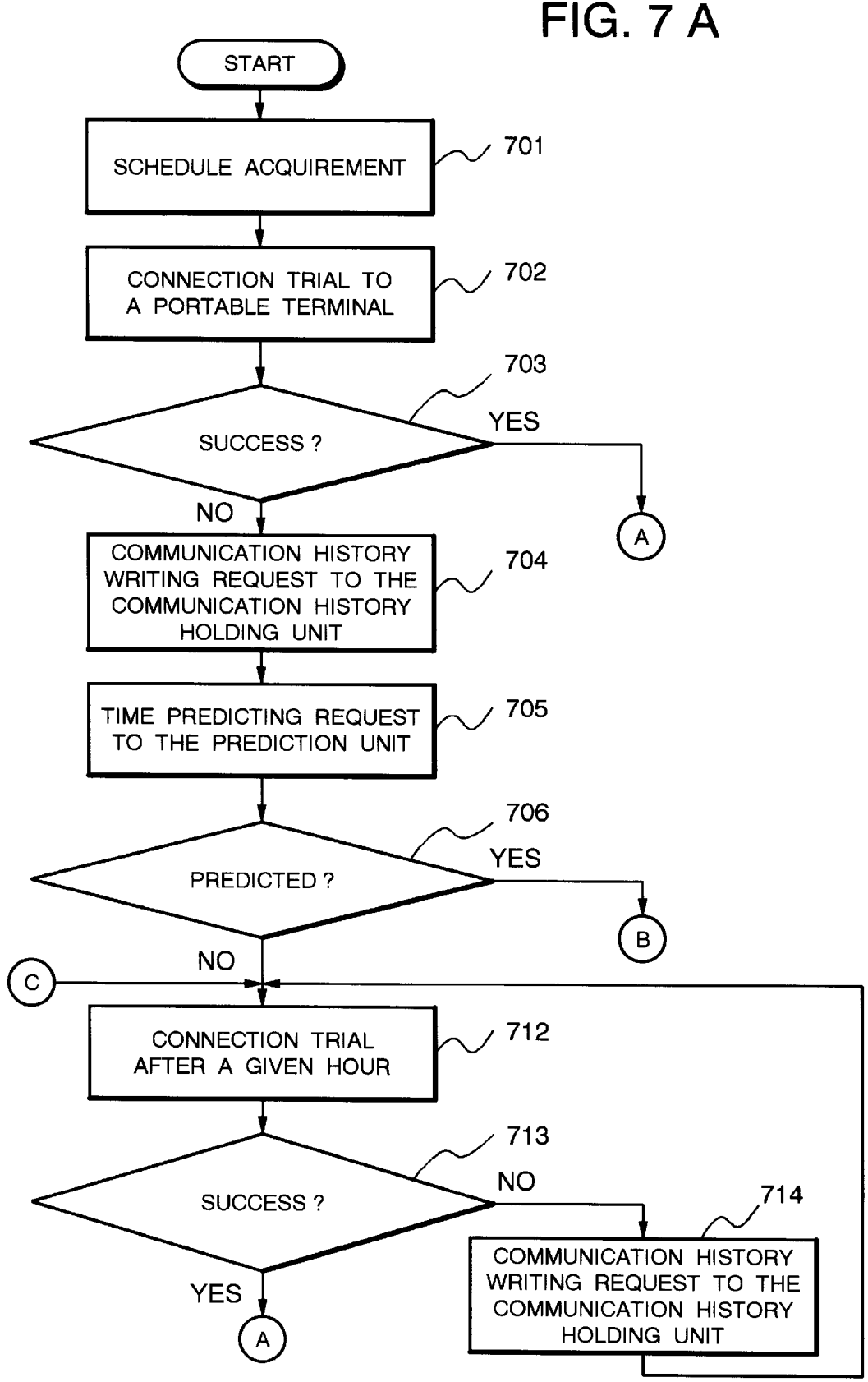
FIG. 7A is a flow chart showing an operation when the database of a server is connected to a terminal equipment.
FIG. 7B is a flow chart showing an operation when the database of a server is connected to a terminal equipment.

Since the schedule data is held within the database 110, the database 110 tries a connection to the terminal equipment 400B at first (Step 702 in FIG. 7).

Since the connection failed because the user B carrying the terminal equipment 400B was outside the office in this time zone, the database 110 issues the communication history writing request 114 of connection failure to the communication history holding unit 150 (Steps 703 and 704). The schedule 1501 of the user B held by the database 110 shown in FIG. 15 indicates that the user B stands in the place "CCC" at the time of 9:00. Then, the information indicated in the space 1801 of FIG. 18 is delivered to the communication history holding unit 150 and held there.

Figure 9:
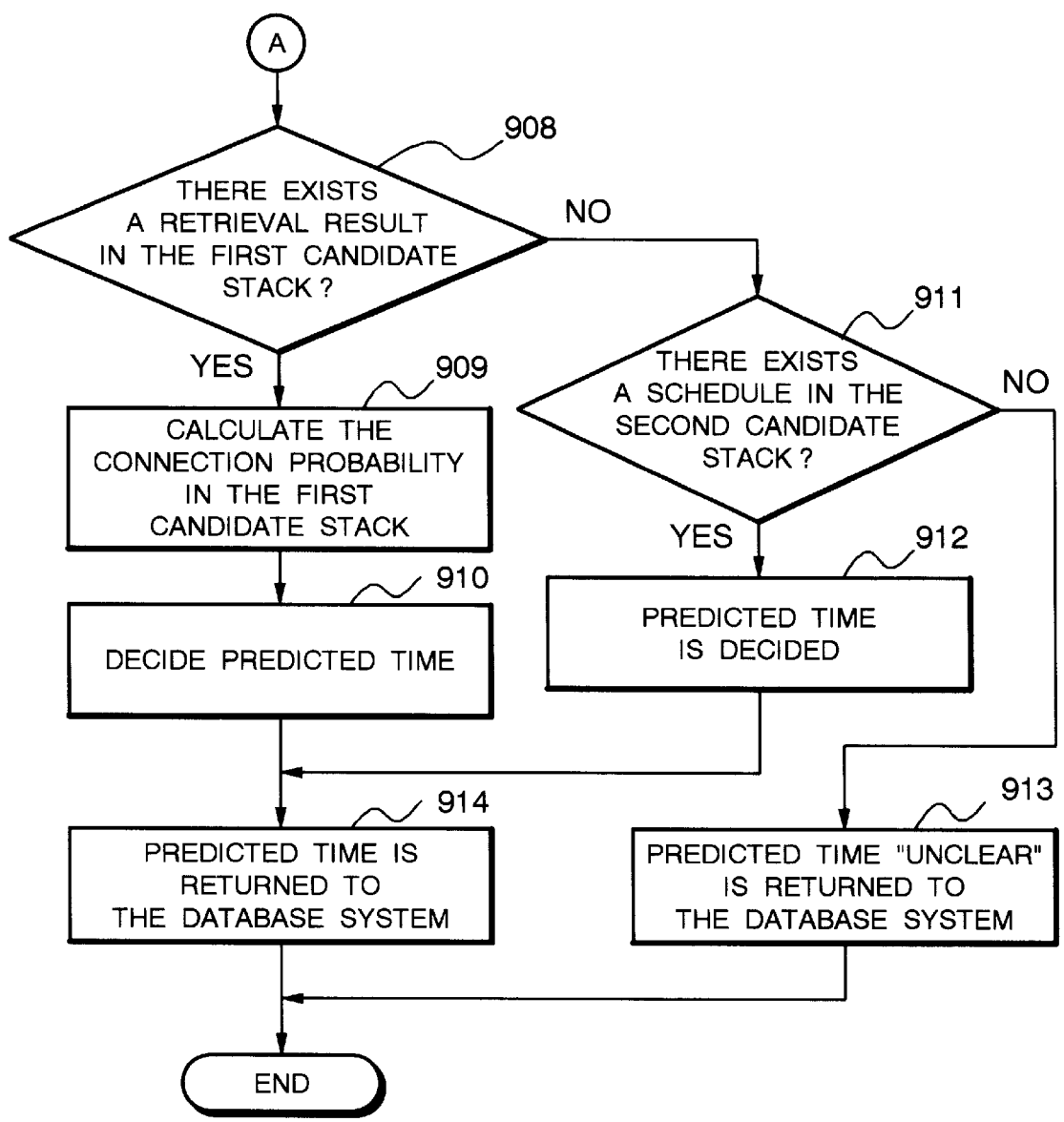
FIG. 9B is a flow chart showing an operation of a prediction unit.

The database 110 issues the time predicting request 113 to the prediction unit 140 (Step 705). Upon receipt of the time predicting request 113, the prediction unit 140 clears the candidate stack (Step 901 in FIG. 9) and obtains the next schedule data of the user B from the database 110 (Step 902). Since the time is past 9:00, it obtains the schedule data 1502 in FIG. 15. Since the schedule data is on the schedule on April 13, the prediction unit 140 adds the place item of the schedule data 1502 "BBB" and issues the content retrieval request 142 to the communication history holding unit 150 (Step 903). The communication history holding unit 150 retrieves the history information 1802 and 1806 having "BBB" in the place item as well as "success" in the item of success or failure in connection, based on the content of the held connection history (refer to FIG. 18) and returns the retrieval result 151 to the prediction unit 140 (Steps 904 and 905).

The prediction unit 140 stores the retrieval result 151 received from the communication history holding unit 150 into the first candidate stack (Step 906), and obtains the next schedule data 1503. However, since the content of the place item defers between the schedule data 1503 and the schedule data 1502, another schedule data having the place item "BBB→AAA" indicating the moving state is created as the next schedule data, before the use of the content of the schedule data 1503 (Step 902). Since this schedule data is of the schedule on April 13, the communication history holding unit 150 delivers the connection history 1803 of FIG. 18 to the prediction unit 140 as the retrieval result 151 (Steps 903 and 904), and the prediction unit 140 stores the connection history 1803 into the first candidate stack (Step 906). Since the place item of the next schedule data 1503 is "AAA", the connection history 1804 is stored in the first candidate stack in the same way (Steps 902 to 906). The content of the first candidate stack at this point is shown in FIG. 19.

Referring to FIG. 15, there exists no schedule next to the schedule data 1503 and the place item "AAA→?" is interpolated as the last schedule, on the assumption that the user returns home finally. The mark "?" means that the user is moving to somewhere not specified and the process of coming home after completion of the work is indicated by "AAA→?". Thus obtained place item "AAA→?" is retrieved from the communication history holding unit 150 and the connection history 1805 of FIG. 18 is obtained. Since there is no more schedule on April 13, the content of the first stack is checked (Step 903). Since there is a retrieval result, the probability of connection is calculated in every place indicated in the history information being held (Steps 908 and 909).

Referring to the history information of the first candidate stack, the probability of success in connection (simple connection probability) in every place is 50% as for "BBB", 100% as for "AAA", and 100% as for "AAA→?". This simple connection probability is obtained by simply calculating how many success histories exist, of all the histories in each place within the stack. Referring to the schedule data of the user B, the prediction unit 140 obtains the time when he or she stands in each place, the time 10:00 when he or she stands in "BBB", the time 13:00 when he or she stands in "AAA", and the time 14:00 when he or she comes back home from "AAA". Then, by the expression as follows;

(simple connection probability)×pow (0.5, (excessive time from the present time)), final probability of connection is calculated. Here, pow (x, y) means the y-th power of x. This indicates that the value of the probability is made half every one hour before and after the present time. Therefore, assuming that the present time is 9:30, the probability of connection becomes 35% as for "BBB", 8% as for "AAA", and 4.5% as for "AAA→?". From the above results, the prediction unit 140 creates a probability attached predicted time list (refer to FIG. 20). For example, the prediction information 2001 shown in FIG. 20 indicates that it stands in "BBB" from 10:00 to 11:30, with 35% probability of connection. Since the connection success probability varies time by time, each simple connection probability is also listed for reference.

The prediction unit 140 returns the created predicted time list 141 to the database 110 (Step 706). The database 110 fetches the time from the received predicted time list in order. Referring to FIG. 20, it is known that a connection is possible from 10:00 to 11:30 in the first prediction information 2001. Then, a connection will be tried at five minutes before the predicted time (9:55 in this case) (Steps 707 and 708). If the connection would be a failure, the database 110 issues the communication history writing request 114 including the current position of the user B "CCC→BBB" and the content "fail in the connection at 9:55" (Step 709). The communication history holding unit 150 holds the content upon receipt of the same communication history writing request 114. Thereby, one line such as;

Apr. 13, 1997 9:55 failure

"CCC BBB" indicated in FIG. 21 is added and recorded in the communication history holding unit 150.

The predicted time list is generally expressed by hour not by time (in the prediction information 2001 of FIG. 20, expressed by hour like 10:00 to 11:30). Since the listed time zone has the probability of connection, even if a connection trial fails, a connection will be tried in every constant hour. When a connection has failed till the last time of the listed time zone (11:30 in the above example), the connection success probability will be calculated again from the simple connection probability. Then, the next prediction information 2002 shown in FIG. 20 is obtained and a connection is tried from 13:00 to 14:00.

When a connection succeeded at 13:35, as the result of repeated connection trials, the connection history shown in FIG. 22 is written in the communication history holding unit 150 (Steps 709 and 710). The message "The user A has modified your schedule. The modified content is as follows." as well as the schedule modification request 115 are issued to the terminal equipment 400B (Step 715). The terminal equipment 400B receives the above message and presents it to the user B.

In the above processing, the modified content presented to the terminal equipment 400B belongs to the schedule 1701 shown in FIG. 17. When the user B accepts the schedule modification with reference to the presented content, the schedule content of the user B shown in FIG. 14 is combined with the update content shown in the schedule 1701 of FIG. 17, which is stored in the database of the terminal equipment 400B as the new schedule data of the user B. Then, the update request 4001B of the user B's schedule held by the database 110 of the schedule server 100B and the update request 4002B of the user B's schedule data held by the terminal equipment 200B are issued and the both schedule data are replaced with the new schedule data (Steps 716 and 717). FIG. 23 shows the new schedule data of the user B. The schedule 2301 of the drawing is the newly added schedule.

On the contrary, when the user B refuses updating of the schedule data, the message such as "Your amendment request has been refused by the user B. Your owing user B's schedule data will be rewritten in the current content held by the user B." is issued to the terminal equipment 200B of the user A (Steps 716 and 718), and the terminal equipment 200B presents this message. The schedule data of the user B held by the terminal equipment 400B is transferred to the terminal equipment 200B of the user A so as to update the schedule data of the user B held by the terminal equipment 200B (Step 719). Further, the terminal equipment 400B also updates the schedule data of the user B held by the database 110 of the schedule server 100B in the same way (Step 720).

As set forth hereinabove, by adopting the present invention in a schedule management system, when the schedule data of a given user is modified by another user, the given user can know the modified content of the data through the connection from the schedule server, without connecting his or her own terminal equipment to the schedule server. Only reply to a message to be presented by his or her own terminal equipment enables automatic execution of a series of processing for keeping consistency of the schedule data. Further, when the schedule server cannot connect to the relevant terminal equipment depending on the position of the terminal equipment, useless connection trials can be prevented from occupying a line, thereby to build a schedule management system capable of efficiently using a line.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A data sharing system comprising a server, which is provided with a database with various data stored therein, capable of transferring the data between another calculating machine and itself and a terminal equipment having an application program capable of receiving the data held by the server through a network and at least referring to the data, for transferring the data between the server and the terminal equipment, wherein:

the server comprising
   a connection party holding means for holding access information indicating relationship between a data name of the transferred data and a calculating machine name of a transfer destination when transferring data;
   a schedule holding means of holding schedule data of a user of the terminal equipment,
   a communication history holding means of holding connection history information including connection trial date and time and connection result as for the data transfer executed in the past, and
   a prediction means for predicting time of the highest possibility of connection to the terminal equipment it tries to connect to, with reference to the schedule data and the connection history, when transferring data from the server to the terminal equipment,
   thereby trying to connect to the terminal equipment that it wants to connect to, in a proper procedure, based on the prediction result of said prediction means, the terminal equipment comprising
   a data acquiring means for supplying a deciding request of a connection party calculating machine for acquiring corresponding data, depending on the necessity, based on the reference request, when a data reference request has been issued from the application program and submitting the corresponding data obtained from the server or the given connection party calculating machine to the application program; and
   a connection party deciding means for deciding a connection party from calculating machines holding the data corresponding to the reference request, with reference to the access information held by said connection party holding means of the server, according to the connection party deciding request supplied from said data acquiring means;

said data acquiring means, when the reference request is issued,
   judging whether the data name of the data specified by the reference request exists in said connection party holding means, with reference to the access information held by said connection party holding means of the server,
   acquiring the corresponding data by issuing the transfer request of the corresponding data to the database of the server when there is not the data name in said connection party holding means, and
   supplying a connection party deciding request for deciding a calculating machine of a connection party and further issuing a data transfer request to the connection party decided by said connection party deciding means so as to obtain the corresponding data when there is the data name.

2. A data sharing system as set forth in claim 1, wherein when the reference request is issued, said data acquiring means of the terminal equipment checks whether the corresponding data is held in the own terminal equipment and when it is held, submits the corresponding data being held to the application program without accessing the server or the given connection party calculating machine.

3. A data sharing system as set forth in claim 1, wherein in the terminal equipment,
the application program includes a function of updating data in addition to data reference, and
said data acquiring means supplies the update request to the database of the server when an update request of data is issued from the application program, while
in the server,
the database updates corresponding data in reply to the update request, and
said connection party holding means records the relationship between a data name of updated data in the database and a calculating machine name of the terminal equipment having issued the above update request.

4. A data sharing system as set forth in claim 1, wherein the access information held by said connection party holding means of the server includes information on a location of the calculating machine that is a data transfer destination, and
said connection party deciding means of the terminal equipment decides a connection party with reference to the information on the location included in the access information.

5. A data sharing system as set forth in claim 1, wherein in the terminal equipment,
the application program includes a function of updating data in addition to data reference, and
said data acquiring means supplies the update request to the database of the server when an update request of data is issued from the application program, while
in the server,
the database updates corresponding data in reply to the update request, and
said connection party holding means records the relationship between a data name of updated data in the database and a calculating machine name of the terminal equipment having issued the above update request,
the access information held by said connection party holding means of the server includes information on a location of the calculating machine that is a data transfer destination, and
said connection party deciding means of the terminal equipment decides a connection party with reference to the information on the location included in the access information.

6. A data sharing system as set forth in claim 1, wherein the access information held by said connection party holding means of the server includes information on size of the transferred data, and said connection party deciding means of the terminal equipment decides a connection party with reference to the information on the data size included in the access information.

7. A data sharing system as set forth in claim 1, wherein in the terminal equipment, the application program includes a function of updating data in addition to data reference, and said data acquiring means supplies the update request to the database of the server when an update request of data is issued from the application program, while in the server, the database updates corresponding data in reply to the update request, and said connection party holding means records the relationship between a data name of updated data in the database and a calculating machine name of the terminal equipment having issued the above update request, the access information held by said connection party holding means of the server includes information on size of the transferred data, and said connection party deciding means of the terminal equipment decides a connection party with reference to the information on the data size included in the access information.

8. A data sharing system as set forth in claim 1, wherein the access information held by said connection party holding means of the server includes information on location of the calculating machine that is a data transfer destination as well as information on size of the transferred data, and said connection party deciding means of the terminal equipment decides a connection party with reference to the information on the location as well as the information on the data size included in the access information.

9. A data sharing system as set forth in claim 1, wherein in the terminal equipment, the application program includes a function of updating data in addition to data reference, and said data acquiring means supplies the update request to the database of the server when an update request of data is issued from the application program, while in the server, the database updates corresponding data in reply to the update request, and said connection party holding means records the relationship between a data name of updated data in the database and a calculating machine name of the terminal equipment having issued the above update request, the access information held by said connection party holding means of the server includes information on location of the calculating machine that is a data transfer destination as well as information on size of the transferred data, and said connection party deciding means of the terminal equipment decides a connection party with reference to the information on the location as well as the information on the data size included in the access information.

10. A data sharing system as set forth in claim 1, wherein the schedule holding means holds schedule data including information on a place where the user stands at a given time, and the communication history holding means holds history information including a place where the terminal equipment of a connection party was standing at the connection time, as for the data transfer executed in the past.

11. A data sharing system as set forth in claim 1, wherein:

in the terminal equipment, the application program includes a function of updating data in addition to data reference, and said data acquiring means supplies the update request to the database of the server when an update request of data is issued from the application program; while in the server, the database updates corresponding data in reply to the update request, and said connection party holding means records the relationship between a data name of updated data in the database and a calculating machine name of the terminal equipment having issued the above update request, wherein the schedule holding means of the server holds schedule data including information on a place where the user stands at a given time, and wherein the communication history holding means of the server holds connection history information including a place where the terminal equipment of a connection party was standing at the connection time, in the data transfer executed in the past.

12. A data sharing system comprising a server, which is provided with a database with various data to be shared in a group stored therein, capable of transferring the data to one or a plurality of terminal equipment used by the group via a network and a terminal equipment capable of at least referring to the data held by the server, for transferring the data between the server and the terminal equipment, wherein the server further comprising:

a schedule holding means of holding schedule data of a user of the terminal equipment;

a communication history holding means of holding connection history information including connection trial date and time and connection result as for the data transfer executed in the past; and a prediction means for predicting time of the highest possibility of connection to the terminal equipment it tries to connect to, with reference to the schedule data and the connection history, when transferring data from the server to the terminal equipment, thereby trying to connect to the terminal equipment that it wants to connect to, in a proper procedure, based on the prediction result of said prediction means.

13. A data sharing system as set forth in claim 12, wherein in the server, the schedule data held by said schedule holding means includes information on a place where the user stands at a given time, and the connection history information held by said communication history holding means includes information on a place where the terminal equipment of a connection party was standing at the connection time.

14. A data sharing system as set forth in claim 12, wherein the terminal equipment comprising an application program capable of receiving the data held by the server through a network and at least referring to the data, for transferring the data between the server and the terminal equipment, a data acquiring means for supplying a deciding request of a connection party calculating machine for acquiring corresponding data, depending on the necessity, based on the reference request, when a data reference request has been issued from the application program and submitting the corresponding data obtained from the server or the given connection party calculating machine to the application program, said data acquiring means when the reference request is issued, acquiring the corresponding data by issuing the transfer request of the corresponding data to the database of the server.

15. A data sharing system as set forth in claim 12, wherein the terminal equipment comprising an application program capable of receiving the data held by the server through a network and at least referring to the data, for transferring the data between the server and the terminal equipment, a data acquiring means for supplying a deciding request of a connection party calculating machine for acquiring corresponding data, depending on the necessity, based on the reference request, when a data reference request has been issued from the application program and submitting the corresponding data obtained from the server or the given connection party calculating machine to the application program, said data acquiring means, when the reference request is issued, checks whether the corresponding data is held in the own terminal equipment, when the corresponding data is held, submits the corresponding data being held to the application program without accessing the server or the given connection party calculating machine, when the corresponding data is not held, acquiring the corresponding data by issuing the transfer request of the corresponding data to the database of the server, and submits the corresponding data being held to the application program.

16. A data sharing system as set forth in claim 12, wherein the terminal equipment comprising an application program capable of receiving the data held by the server through a network and at least referring to the data, for transferring the data between the server and the terminal equipment, a data acquiring means for supplying a deciding request of a connection party calculating machine for acquiring corresponding data, depending on the necessity, based on the reference request, when a data reference request has been issued from the application program and submitting the corresponding data obtained from the server or the given connection party calculating machine to the application program, in the terminal equipment, the application program includes a function of updating data in addition to data reference, and said data acquiring means supplies the update request to the database of the server when an update request of data is issued from the application program, while in the server, the database updates corresponding data in reply to the update request, and said connection party holding means records the relationship between a data name of updated data in the database and a calculating machine name of the terminal equipment having issued the above update request.

17. A data sharing system as set forth in claim 12, wherein the terminal equipment comprising an application program capable of receiving the data held by the server through a network and at least referring to the data, for transferring the data between the server and the terminal equipment, a data acquiring means for supplying a deciding request of a connection party calculating machine for acquiring corresponding data, depending on the necessity, based on the reference request, when a data reference request has been issued from the application program and submitting the corresponding data obtained from the server or the given connection party calculating machine to the application program, in the terminal equipment, the application program includes a function of updating data in addition to data reference, and said data acquiring means supplies the update request to the database of the server when an update request of data is issued from the application program; while in the server, the database updates corresponding data in reply to the update request, and said connection party holding means records the relationship between a data name of updated data in the database and a calculating machine name of the terminal equipment having issued the above update request, and when data of the database system is updated and a terminal equipment other than the terminal equipment having issued the update request refers to the updated data, the terminal equipment having issued the update request is also regarded as a candidate of a connection party.

\* \* \* \* \*